United States Patent
Amano et al.

(10) Patent No.: US 9,457,664 B2
(45) Date of Patent: Oct. 4, 2016

(54) DISPLAY DEVICE

(71) Applicant: TOYOTA JIDOSHA KABUSHIKI KAISHA, Toyota-shi, Aichi-ken (JP)

(72) Inventors: Takashi Amano, Susono (JP); Kaoru Kubo, Miyoshi (JP); Taishi Hisano, Nisshin (JP); Yasushi Ozawa, Nisshin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/766,555

(22) PCT Filed: Feb. 8, 2013

(86) PCT No.: PCT/JP2013/053140
§ 371 (c)(1),
(2) Date: Aug. 7, 2015

(87) PCT Pub. No.: WO2014/122785
PCT Pub. Date: Aug. 14, 2014

(65) Prior Publication Data
US 2015/0367731 A1    Dec. 24, 2015

(51) Int. Cl.
*G06F 7/00* (2006.01)
*B60K 35/00* (2006.01)
(Continued)

(52) U.S. Cl.
CPC ........... *B60K 35/00* (2013.01); *B60R 16/0236* (2013.01); *F02D 29/02* (2013.01); *G06F 3/14* (2013.01); *B60K 2350/1056* (2013.01); *B60K 2350/352* (2013.01); *F02D 2200/0625* (2013.01); *F02D 2200/602* (2013.01); *F02D 2200/606* (2013.01)

(58) Field of Classification Search
CPC .......... B60K 35/00; B60K 2350/1056; B60K 2350/352; B60R 16/0236; F02D 29/02; F02D 2200/0625; F02D 2200/602; F02D 2200/606; G06F 3/14
USPC ...................... 701/36, 70; 340/461, 462, 525
See application file for complete search history.

(56) References Cited

U.S. PATENT DOCUMENTS 6,216,079 B1 * 4/2001 Matsuda ............... B60T 8/1755
                                                              701/48
9,254,757 B2 * 2/2016 Yamamoto ............. B60K 6/445
(Continued)

FOREIGN PATENT DOCUMENTS

JP      S58-124954 A       7/1983
JP      2002-274219 A      9/2002
(Continued)

*Primary Examiner* — Shardul Patel
(74) *Attorney, Agent, or Firm* — Kenyon & Kenyon LLP

(57) ABSTRACT

A display device includes: first setting means for setting a first operation amount to be performed by an occupant so as to increase an output in a state in which a vehicle speed is less than a predetermined threshold; second setting means for setting a second operation amount to be performed by the occupant such that an operation state of the vehicle can be shifted to a desired state in which optimal instantaneous fuel consumption is realized, by decreasing the output in a state in which the vehicle speed is equal to or greater than the predetermined threshold; and display means for displaying, on a display unit, at least one of the first operation amount and the second operation amount, and a present operation amount which is an operation amount performed at present by the occupant.

11 Claims, 11 Drawing Sheets

(51) Int. Cl.
  *F02D 29/02* (2006.01)
  *B60R 16/023* (2006.01)
  *G06F 3/14* (2006.01)

(56) References Cited

U.S. PATENT DOCUMENTS

| | | | |
|---|---|---|---|
| 2004/0008109 A1* | 1/2004 | Endoh | B60R 16/0232 340/450.2 |
| 2005/0021222 A1* | 1/2005 | Minami | G07C 5/0858 701/123 |
| 2009/0251304 A1* | 10/2009 | Saito | F02B 77/084 340/441 |
| 2010/0259374 A1* | 10/2010 | Matsuo | F02D 29/02 340/439 |
| 2013/0218412 A1* | 8/2013 | Ricci | G06F 17/00 701/36 |
| 2014/0012464 A1* | 1/2014 | Hiei | B60R 1/00 701/36 |
| 2015/0005982 A1* | 1/2015 | Muthukumar | B60T 1/10 701/1 |

FOREIGN PATENT DOCUMENTS

| | | |
|---|---|---|
| JP | 2008-105559 A | 5/2008 |
| JP | 2009-168655 A | 7/2009 |

\* cited by examiner

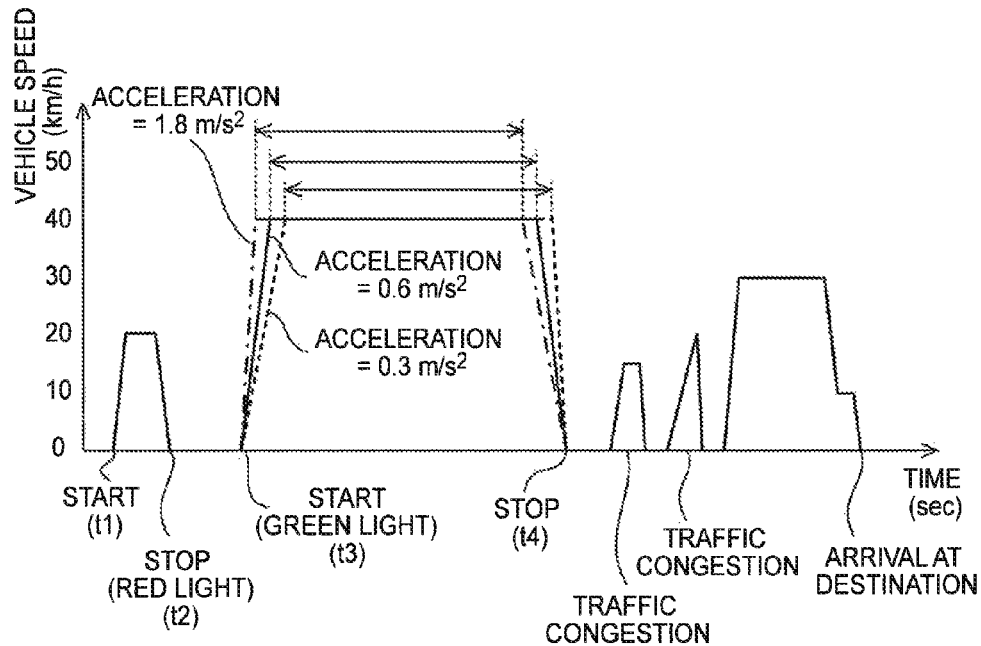

DISPLAY DEVICE

CROSS-REFERENCE TO RELATED APPLICATION

This is a national phase application based on the PCT International Patent Application No. PCT/JP2013/053140 filed Feb. 8, 2013, the entire contents of which are incorporated herein by reference.

TECHNICAL FIELD

The invention relates to a technical field of display devices that can display, for example, the amounts of operations to be performed by an occupant of a vehicle.

BACKGROUND ART

A display device that displays information relating to fuel consumption in order to encourage a driver to drive with consideration for fuel consumption has been suggested. For example, Patent Literature 1 discloses a display device that displays instantaneous fuel consumption corresponding to the present fuel consumption and target fuel consumption corresponding to the fuel consumption which is a target, and also displays an accelerator depression amount with an indicator common to the instantaneous fuel consumption and target fuel consumption. With the display device disclosed in Patent Literature 1, the driver can visually and instantaneously determine the relationship between the change in instantaneous fuel consumption and the operation of depressing the accelerator. As a result, the driver is encouraged to drive so as to improve the instantaneous fuel consumption and can visually recognize the type of operations to be performed.

Examples of related art literature relevant to the present invention include Patent Literature 2 to 4. Patent Literature 2 discloses a display device that recalculates the amount of change of kinetic energy and the amount of change of potential energy of a vehicle into a distance that can be traveled and displays a substantial fuel consumption that also takes into account the recalculated travel distance. Patent Literature 3 discloses a display device that displays a revolution speed and a vehicle speed on the same screen. Patent Literature 4 discloses a display device such that when an accelerator depression amount display value corresponding to the actual accelerator depression amount and a target depression amount display value corresponding to the target accelerator depression amount are displayed, the target accelerator depression amount display value is fixed to a predetermined value at all times regardless of the target accelerator depression amount.

RELATED LITERATURE

Patent Literature

Patent Literature 1: Japanese Patent Application Publication No. 2009-168655 (JP 2009-168655 A)
Patent Literature 2: Japanese Patent Application Publication No. 2002-274219 (JP2002-274219 A)
Patent Literature 3: Japanese Patent Application Publication No. S58-124954 (JP S58-124954 A)
Patent Literature 4: Japanese Patent Application Publication No. 2008-105559 (JP 2008-105559 A)

SUMMARY OF THE INVENTION

Problem to be Solved by the Invention

However, as mentioned hereinabove, the fuel consumption displayed on the display device disclosed in, for example, Patent Literature 1 is instantaneous fuel consumption. Therefore, the driver looking on the display disclosed in, for example, Patent Literature 1 operates the accelerator and the like so as to improve the instantaneous fuel consumption (for example to match the instantaneous fuel consumption with the target fuel consumption)

However, where the instantaneous fuel consumption is simply improved, there may be situations in which, for example, the fuel consumption in the process in which the vehicle is to travel through a road of a desired distance within the desired interval of time (the so-called actual fuel consumption calculated on the basis of the actual distance traveled within a predetermined period of time and the actual fuel injection amount within the predetermined period of time) is, conversely, degraded. In other words, where the instantaneous fuel consumption is simply improved, there may be situations in which, for example, the actual fuel consumption that takes into account the future running state of the vehicle is, conversely, degraded.

For example, in order to improve the instantaneous fuel consumption, the driver typically may decrease the operation amount (in other words, the depression amount) of the accelerator. Where the operation amount of the accelerator is decreased, the acceleration of the vehicle naturally decreases. As a result, the interval of time required for the vehicle that has started moving from a stop state to reach the cruise speed increases longer, in comparison with the case in which the operation amount of the accelerator is not decreased. Therefore, when a distance of travel is the same, the interval of time, in which the vehicle runs steadily at the cruise speed, is relatively shortened. Meanwhile, by allowing the degradation of instantaneous fuel consumption and increasing the operation amount of the accelerator (in other words, rapidly accelerating the vehicle), it is possible to shorten the interval of time required for the vehicle that has started moving from a stop state to reach the cruise speed. Therefore, when a distance of travel is the same, the interval of time in which the vehicle runs steadily at the cruise speed is relatively extended. Where such two running patterns are compared, the actual fuel consumption in the process in which the vehicle runs at the cruise speed after starting from a stop state can be sometimes improved when the cruise speed is reached within a short interval of time (as a result, the interval of time of steady running is extended) over that when the depression amount of the accelerator is decreased to improve the instantaneous fuel consumption (in this case, the interval of time of steady running is shortened).

However, a technical problem encountered when the instantaneous fuel consumption is simply displayed, as disclosed, for example, in Patent Literature 1, is that the driver cannot recognize how to run (for example, by operating the accelerator) the vehicle in the future so as to improve actual fuel consumption that reflects the future running pattern of the vehicle.

Described hereinabove is an example of problems to be resolved by the invention. It is an objective of the invention to provide a display device that enables the driver to recognize the operations to be performed by the driver to improve fuel consumption (in particular, actual fuel consumption) and a display control device that controls such a display device.

Means for Solving the Problem

<1> In order to attain the objective, the invention provides a display device including: first setting means for setting a first operation amount to be performed by an occupant of a vehicle so as to increase an output of the vehicle in a state in which a speed of the vehicle is less than a predetermined threshold; second setting means for setting a second operation amount to be performed by the occupant such that an operation state of the vehicle can be shifted to a desired operation state in which optimal instantaneous fuel consumption is realized, by decreasing the output in a state in which the vehicle speed is equal to or greater than the predetermined threshold; and display means for displaying, on a display unit, at least one of the first operation amount and the second operation amount, and a present operation amount which is an operation amount performed at present by the occupant.

With the display device of the invention, the display means displays, on the display unit, at least either one of the first operation amount and the second operation amount to be performed by the occupant, and the present operation amount which is an operation amount performed at present by the occupant. Therefore, the occupant can perform appropriate operations by comparing the present operation amount with at least either one of the first operation amount and the second operation amount.

The "operation amount (that is, the first operation amount, second operation amount, and present operation amount)", as referred to herein, may directly represent an indicator of the operations to be performed by the occupant. The operation amount of the accelerator is an example of such direct operation amount. Alternatively, the "operation amount" may indirectly represent an indicator of the operations to be performed by the occupant (that is, enables the recognition of the operations to be performed by the occupant by reference to the indicator). The vehicle output or vehicle speed are examples of such indirect operation amounts.

In the invention, the first operation amount and second operation amount are preferably set from the standpoint of improving (preferably, optimizing) the actual fuel consumption of the vehicle running as a result of the operations corresponding to the first operation amount and second operation amount (for example, fuel consumption calculated from the running distance of the vehicle within a period, of time in which the operations corresponding to the first operation amount and second operation amount are performed, and the fuel injection amount within this period of time). In other words, it is preferred that the first operation amount and second operation amount be set from the standpoint of improving the actual fuel consumption of the vehicle running as a result of the operations corresponding to the first operation amount and second operation amount in comparison with the actual fuel consumption of the vehicle running as a result of the operations other than the operations corresponding to the first operation amount and second operation amount.

More specifically, the first setting means sets the first operation amount from the following standpoint. The first operation amount is an operation amount to be performed by the occupant in a state in which the speed of the vehicle is less than the predetermined threshold. In particular, the first operation amount is an operation amount to be performed by the occupant such as to increase the output of the vehicle (for example, to increase the output gradually in a continuous or stepwise manner). In other words, the first operation amount can be said to be an operation amount to be performed by the occupant such as to accelerate the vehicle because the vehicle speed has become less than the predetermined threshold. Thus, the first operation amount can be also said to be an operation amount to be performed by the occupant in a transition period in which the vehicle accelerates.

Therefore, the vehicle that runs as a result of performing the operation corresponding to the first operation amount typically travels such as to increase the vehicle speed while increasing the output.

Accordingly as mentioned hereinabove, it is preferred that the first operation amount be set from the standpoint of improving the actual fuel consumption of the vehicle that runs as a result of performing the operations corresponding to both the first operation amount and the second operation amount which is set by the second setting means. Therefore, it is not always necessary that the instantaneous fuel consumption of the vehicle at a point of time at which the operations corresponding to the first operation amount are performed (for example, the fuel consumption calculated from the vehicle speed and fuel injection amount at the point of time in which the instantaneous fuel consumption is calculated) be optimal.

Meanwhile, the second setting means sets the second operation amount from the following standpoints. The second operation amount is an operation amount to be performed by the occupant in a situation in which the speed of the vehicle is equal to or greater than a predetermined threshold. In particular, the second operation amount is an operation amount to be performed by the occupant such as to decrease the vehicle output (for example, to decrease the output gradually in a continuous or stepwise manner). Moreover, the second operation amount is an operation amount such that the operation state of the vehicle (in other words, the running state) can be shifted to the desired operation state in which optimal instantaneous fuel consumption is realized. In other words, the second operation amount substantially can be called an operation amount to be performed by the occupant at a point of time in which the necessity of accelerating the vehicle has decreased because the vehicle has started running steadily (in other words, running at a constant speed) or will start running steadily in the near future. Thus, the second operation amount can be also said to be an operation amount to be performed by the occupant in a steady period of time in which the vehicle runs steadily.

The "operation state", as referred herein, may also mean, for example, the state of a vehicle (in other words, the condition of the vehicle or the mode of the vehicle) which is uniquely specified by a random indicator that can directly or indirectly indicate the state of at least either one of the vehicle itself and the constituent element (for example, internal combustion engine or rotating electrical machine) constituting the vehicle. Examples of such indicators include the vehicle output, vehicle speed, revolution speed of at least one of the internal combustion engine and rotating electrical machine, and torque of at least one of the internal combustion engine and rotating electrical machine. In this case, the operation state uniquely specified by the vehicle output and vehicle speed, or the operation state uniquely specified by the revolution speed of the internal combustion engine and the torque of the internal combustion engine are considered as examples of the operation state.

Therefore, the vehicle that runs as a result of performing the operations corresponding to the second operation amount typically runs such that running in the desired operation state can be started by decreasing the output. When the vehicle speed is relatively high (that is, equal to or greater than a threshold), the vehicle speed hardly decreases even when the output is decreased. Therefore, the vehicle that runs as a result of performing the operations corresponding to the second operation amount typically runs such as to decrease the output without changing greatly the vehicle speed (in other words, while maintaining the vehicle speed).

Accordingly, as mentioned hereinabove, it is preferred that the second operation amount be set from the standpoint of improving the actual fuel consumption of the vehicle that runs as a result of performing the operations corresponding to both the above-described first operation amount and the second operation amount. Therefore, the instantaneous fuel consumption of the vehicle at a point of time in which the operations corresponding to the second operation amount are performed may not necessarily be optimal. However, it is preferred that the instantaneous fuel consumption of the vehicle at a point of time in which the operation state of the vehicle has shifted to the described operation state as a result of performing the operations corresponding to the second operation amount be optimal The second operation amount is preferably an operation amount to be performed by the occupant following the operations corresponding to the first operation amount. Therefore, it is preferred that the occupant accelerate the vehicle such that the vehicle speed becomes equal to or greater than the predetermined threshold by performing the operations corresponding to the first operation amount. When the vehicle speed has become equal to or greater than the predetermined threshold, it is preferred that the occupant run the vehicle steadily in the desired operation state by decreasing the vehicle output by performing the operations corresponding to the second operation amount.

The vehicle typically runs in the following manner as a result of the occupant operating the vehicle with reference to the first operation amount and second operation amount.

When the vehicle speed is relatively small (in other words, less than the predetermined threshold), the vehicle runs such as to increase the vehicle speed while increasing the output according to the occupant's operation corresponding to the first operation amount. At this time, the vehicle accelerates relatively strongly (in other words, aggressively) as compared with the case in which the vehicle runs while maintaining a state in which the instantaneous fuel consumption is optimal, because the instantaneous fuel consumption of the vehicle running as a result of performing the operations corresponding to the first operation amount is not necessarily optimal. In other words, a relatively strong acceleration aimed at the optimization of actual fuel consumption is preferred over a relatively weak acceleration aimed at the optimization of instantaneous fuel consumption. In order to realize such running, it is preferred that the first operation amount be an operation amount such that a relatively strong acceleration aimed at the optimization of actual fuel consumption is preferred over a relatively weak acceleration aimed at the optimization of instantaneous fuel consumption. As a result, the vehicle speed at which the vehicle is to run steadily (that is, the cruise speed) is reached faster than in the case in which the vehicle runs while maintaining a state in which the instantaneous fuel consumption is optimal. In other words, the period of time before the steady run is started (that is, the period of time in which acceleration is performed) is shortened by comparison with the ease in which the vehicle runs while maintaining a state in which the instantaneous fuel consumption is optimal.

After the vehicle speed at which the vehicle is to run steadily is reached, the vehicle runs while reducing the output according to the occupant's operations corresponding to the second operation amount, because the vehicle speed is relatively high (that is, equal to or greater than the predetermined threshold). As a result, the operation sate of the vehicle shifts to the desired operation state in which the instantaneous fuel consumption is optimal (or an operation state close to the desired operation state or similar to the desired operation state). Therefore, the vehicle can run steadily in the desired operation state (or an operation state close to the desired operation state or similar to the desired operation state). In particular, the vehicle can continue to run steadily for a period of time longer than that in the case in which the period of time till the steady running is started has not been shortened, because the period of time till the steady running is started is shortened by the occupant's operations corresponding to the first operation amount. In other words, the vehicle can run continuously for a longer period of time in the desired operation state in which the instantaneous fuel consumption is optimal (or an operation state close to the desired operation state or similar to the desired operation state). As a result, the effect of improving the actual fuel consumption is increased.

Thus, the display device of the invention can appropriately display the operation amount to be performed by the occupant in the future in order to improve the actual fuel consumption. More specifically, the display device of the invention can initially encourage the occupant to accelerate the vehicle aggressively (for example, encourage the acceleration till the cruise speed is reached), and then encourage the occupant to start the steady running in the desired operation state in which the optimal instantaneous fuel consumption can be realized. In other words, the display device of the invention can encourage the optimization (for example, shortening) of the period of time required for the vehicle to start running steadily and the optimization (for example, enlargement) of the period of time in which the steady running is continued. Therefore, the actual fuel consumption of the vehicle traveling according to the operations performed by the occupant with reference to the first operation amount and second operation amount tends to be improved easier than the actual fuel consumption of the vehicle traveling according to the operations performed by the occupant without reference to the first operation amount and second operation amount.

It is preferred that an appropriate value corresponding to the difference between the cases in which the first operation amount and second operation amount are referred to (typically, the difference in vehicle speed) be set as the "predetermined threshold" used for dividing the first operation amount and second operation amount. For example, the predetermined threshold can be a vehicle speed (for example, the target value of the vehicle speed corresponding to the cruise speed) corresponding to the boundary between the vehicle speed range in which the vehicle is to be accelerated and the vehicle speed range in which the vehicle is to run steadily.

<2> According to another aspect of the display device of the invention, the display means continuously displays the first operation amount and the second operation amount.

In accordance with this aspect, the first operation amount and second operation amount are continuously displayed (preferably, continuously displayed on the same display section). In this case, depending on the circumstances, the first operation amount and the second operation amount are displayed simultaneously on the same display section. Therefore, the occupant can recognize appropriately and in advance the tendency of the operation amount to be performed in the future to increase the fuel efficiency. As a result, the occupant can easily perform the operations corresponding to the first operation amount and second operation amount. Therefore, the improvement of actual fuel consumption can be advantageously realized.

Where it is taken into account that the first operation amount and second operation amount are operation amounts that can be differentiated by the vehicle speed, it is preferred that the first operation amount and second operation amount be displayed continuously in association with the vehicle speed. An example of such a display will be explained hereinbelow in greater detail with reference to the drawings.

<3> According to another aspect of the display device in which the first operation amount and the second operation amount are displayed continuously, as mentioned hereinabove, the display means displays the first operation amount and the second operation amount together with a past operation amount which is an operation amount performed by the occupant in the past.

In accordance with this aspect, the occupant can recognize whether or not the operations performed in the past match the first operation amount and second operation amount. As a result, the occupant can learn whether the operations performed in the past are appropriate operations. Therefore, the improvement of actual fuel consumption can be advantageously realized.

<4> According to yet another aspect of the display device of the invention, the first setting means sets, as the first operation amount, a first operation range which is an allowed range of an operation amount to be performed by the occupant so as to increase the output in a state in which the vehicle speed is less than the predetermined threshold; the second setting means sets, as the second operation amount, a second operation range which is an allowed range of an operation amount to be performed by the occupant so as to shift the operation state of the vehicle to the desired operation state by decreasing the output in a state in which the vehicle speed is equal to or greater than the predetermined threshold; and the display means continuously displays the first operation range and the second operation range.

In accordance with this aspect, the first operation amount and the second operation amount are displayed as operation ranges (the so-called zones) maintaining the allowable width. Therefore, the operations performed by the occupant himself are easily matched with the first operation range and the second operation range. Therefore, the improvement of actual fuel consumption can be advantageously realized.

Further, in accordance with this aspect, the first operation range and second operation range are continuously displayed (preferably, continuously displayed on the same display section, in other words, displayed simultaneously). In this case, depending on the circumstances, the first operation range and second operation range are displayed simultaneously on the same display section. Therefore, the occupant can recognize appropriately and in advance the tendency of the operation amount to be performed in the future to increase fuel efficiency. As a result, the occupant easily performs the operations corresponding to the first operation range and second operation range. Therefore, the improvement of actual fuel consumption can be advantageously realized.

Where it is taken into account that the first operation range and second operation range are operation amounts that can be differentiated by the vehicle speed, it is preferred that the first operation range and second operation range be displayed continuously in association with the vehicle speed. An example of such a display will be explained hereinbelow in greater detail with reference to the drawings.

<5> According to another aspect of the display device in which the first operation range and the second operation range are displayed continuously, as mentioned hereinabove, the display means displays the first operation range and the second operation range together with a past operation amount which is an operation amount performed by the occupant in the past.

In accordance with this aspect, the occupant can recognize whether or not the operations performed in the past match the first operation amount and the second operation amount. As a result, the occupant can learn whether the operations performed in the past are appropriate operations. Therefore, the improvement of actual fuel consumption can be advantageously realized.

<6> According to yet another aspect of the display device of the invention, the display means (i) displays the first operation amount and the present operation amount, but does not display the second operation amount, when the vehicle speed is less than the predetermined threshold, and (ii) displays the second operation amount and the present operation amount, but does not display the first operation amount, when the vehicle speed is equal to or greater than the predetermined threshold.

In accordance with this aspect, the display means displays an one operation amount, which is to be performed (in other words, which is to be referred to) by the occupant at the present point of time, and which is one of the first operation amount and the second operation amount. In other words, the display means may not display another operation amount which may not be performed (in other words, which may not be referred to) by the occupant at the present point of time, and which is one of the first operation amount and the second operation amount. Therefore, the occupant can intuitively recognize which operation is to be presently performed. As a result, the occupant easily performs the operations corresponding to the first operation amount and the second operation amount. Therefore, the improvement of actual fuel consumption can be advantageously realized.

<7> According to yet another aspect of the display device of the invention, the first setting means sets, as the first operation amount, a first operation range which is an allowed range of an operation amount to be performed by the occupant so as to increase the output in a state in which the vehicle speed is less than the predetermined threshold; the second setting means sets, as the second operation amount, a second operation range which is an allowed range of an operation amount to be performed by the occupant so as to shift the operation state of the vehicle to the desired operation state by decreasing the output in the state in which the vehicle speed is equal to or greater than the predetermined threshold; and the display means (i) displays the first operation range and the present operation amount, but does not display the second operation range, when the vehicle speed is less than the predetermined threshold, and (ii) displays the second operation range and the present operation amount, but does not display the first operation range, when the vehicle speed is equal to or greater than the predetermined threshold.

In accordance with this aspect, the first operation amount and the second operation amount are displayed as the first operation range and the second operation range maintaining the allowable width. Therefore, the operation performed by the occupant himself are easily matched with the first operation range and the second operation range. Therefore, the improvement of actual fuel consumption can be advantageously realized.

In addition, in accordance with this aspect, the display means displays an operation range which is to be performed (in other words, which is to be referred to) by the occupant at the present point of time, and which one of the first operation range and the second operation range. In other words, the display means may not display another operation range which may not be performed in other words, which may not be referred to) by the occupant at the present point of time, and which is one of the first operation range and the second operation range. Therefore, the occupant can intuitively recognize which operation is to be presently performed. As a result, the occupant easily performs the operations corresponding to the first operation range and the second operation range. Therefore, the improvement of actual fuel consumption can be advantageously realized.

<8> According to yet another aspect of the display device of the invention, the first setting means sets, as the first operation amount, an operation amount that can encourage further acceleration of the vehicle, as compared with an operation amount which is set to increase the output, while maintaining a state in which an instantaneous fuel consumption is optimal.

In accordance with this aspect, the occupant can recognize that a relatively strong acceleration aimed at the optimization of the actual fuel consumption should be prioritized over a relatively weak acceleration aimed at the optimization of the instantaneous fuel consumption. Therefore, the improvement of actual fuel consumption can be advantageously realized.

<9> According to yet another aspect of the display device of the invention, the first setting means sets, as the first operation amount, an operation amount to be performed by the occupant so as to increase the output according to an increase in the vehicle speed.

In accordance with this aspect, the occupant can recognize that when the vehicle speed is relatively low (in other words, when the vehicle is to be accelerated because the vehicle speed is lower than the predetermined threshold), a relatively strong acceleration aimed at the optimization of the actual fuel consumption should be prioritized over a relatively weak acceleration aimed at the optimization of the instantaneous fuel consumption. Therefore, the improvement of actual fuel consumption can be advantageously realized.

<10> According to yet another aspect of the display device of the invention, the second setting means sets, as the second operation amount, an operation amount to be performed by the occupant so as to decrease the output while maintaining the vehicle speed.

In accordance with this aspect, the occupant can recognize that when the vehicle speed is relatively high (in other words, when the vehicle is to run steadily because the vehicle speed is equal to or higher than the predetermined threshold), steady running in the desired operation state is to be started by decreasing the output. Therefore, the improvement of actual fuel consumption can be advantageously realized.

<11> According to yet another aspect of the display device of the invention, the vehicle is a hybrid vehicle equipped with a rotating electrical machine that is driven by using power stored in an electrical storage device, and an internal combustion engine driven by combustion of fuel; and the desired operation state is an operation state in which the hybrid vehicle can run in an EV running mode in which running is performed by using drive power of the rotating electrical machine, without using drive power of the internal combustion engine.

In accordance with this aspect, the vehicle can run continuously in the EV running mode for a longer period of time. Therefore, the improvement of actual fuel consumption can be advantageously realized.

The operation and other advantages of the invention will become more apparent from the below-described embodiments.

BRIEF DESCRIPTION OF THE DRAWINGS

FIG. 2(a) and FIG. 2(b) depict a graph and a table, respectively, illustrating an example of grounds for setting the fuel-efficient induction zone of the first embodiment.

MODES FOR CARRYING OUT THE INVENTION

Figure 1:
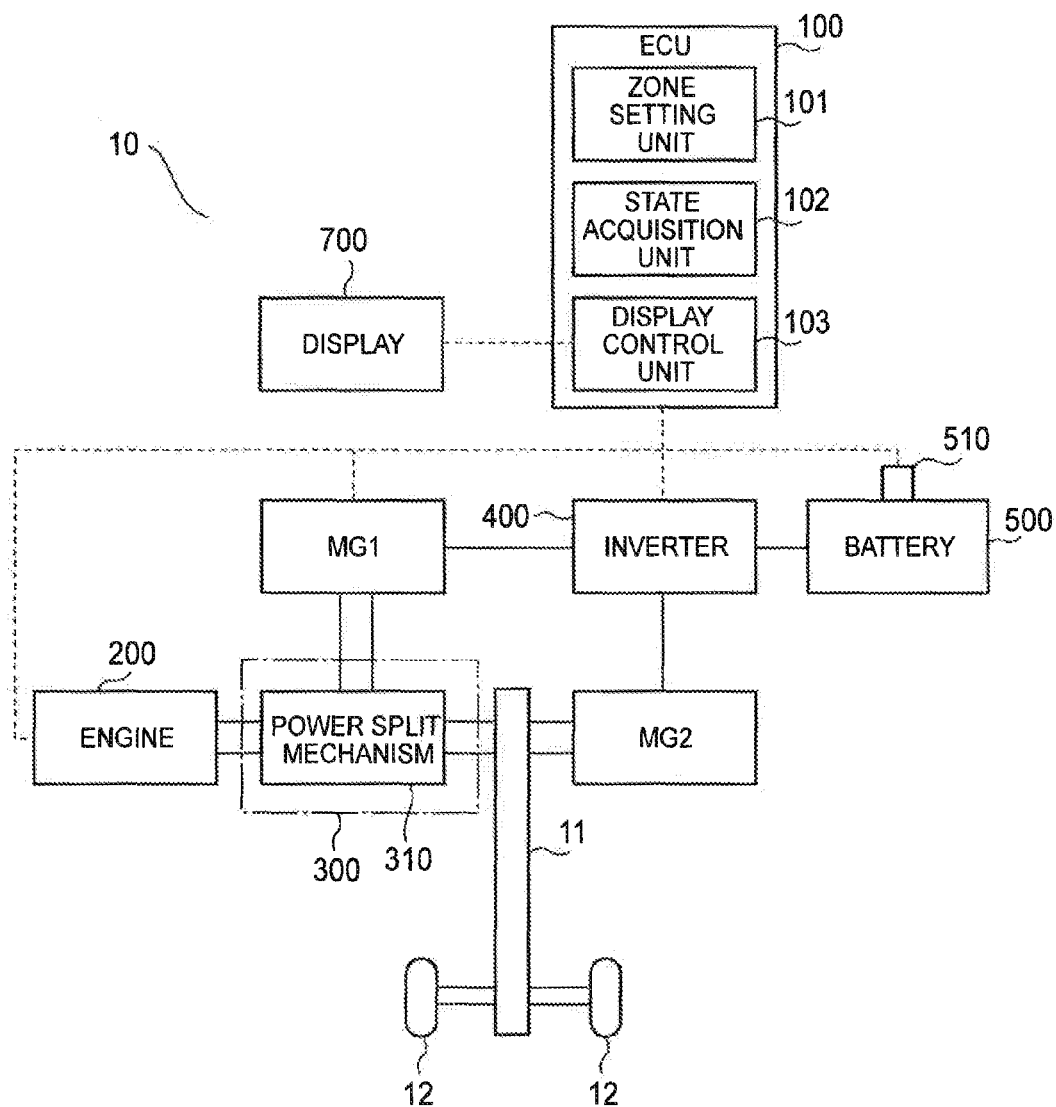
FIG. 1 is a block diagram illustrating an example of the configuration of the hybrid vehicle of the embodiment.

An embodiment of the invention in which the invention is applied to a hybrid vehicle 10 equipped with motor generators MG1 and MG2 and an engine 200 will be explained hereinbelow as an example of a mode for carrying out the invention (1) Configuration of Hybrid Vehicle Initially, the configuration of the hybrid vehicle 10 of the embodiment will be explained with reference to FIG. 1. FIG. 1 is a block diagram illustrating an example of the configuration of the hybrid vehicle 10 of the embodiment.

As depicted in FIG. 1, the hybrid vehicle 10 is provided with an axle 11, wheels 12, an ECU 100, the engine 200, the motor generator MG1, the motor generator MG2, a transaxle 300, an inverter 400, a battery 500, a state of charge (SOC) sensor 510, and a display 700.

The axle 11 is a transmission shaft for transmitting power outputted from the engine 200 and the motor generator MG2 to the wheels.

The wheels 12 transmit to a road surface the power transmitted through the below-described axle 11. FIG. 1 illustrates an example in which the hybrid vehicle 10 is provided with a pair of wheels 12, one wheel on the left side and one wheel 12 on the right side, but it is actually preferred that one wheel 12 be provided on each of the front left, front right, rear left, and rear right sides (a total of four wheels 12 be provided).

The engine 200 is a gasoline engine which is an example of the "internal combustion engine" and functions as a main power source for the hybrid vehicle 10. The detailed configuration of the engine 200 is explained hereinbelow.

The motor generator MG1 is an example of the "rotating electrical machine" and configured as a generator for charging the battery 500 or supplying electric power to the motor generator MG2 and also functions as a motor that assists the drive power of the engine 200.

The motor generator MG2 is an example of the "rotating electrical machine" and configured as a motor that assists the drive power of the engine 200 or functions as a generator for charging the battery 500.

The motor generator MG1 and the motor generator MG2 are each, for example, a synchronous motor generator. Therefore, the motor generator MG1 and the motor generator MG2 are each provided with a rotor having a plurality of permanent magnets on the outer circumferential surface and a stator on which a three-phase coil forming a rotating magnetic field is wound. At least one of the motor generator MG1 and the motor generator MG2 may be a motor generator of another type.

The transaxle 300 is a power transmission mechanism in which, for example, a transmission or a differential gear is integrated. The transaxle 300 is provided, in particular, with a power split mechanism 310.

The power split mechanism 310 is a planetary gear mechanism provided with a sun gear, a planetary gear, a pinion gear, and a ring gear (not shown in the figure). Among those gears, the rotating shaft of the sun gear located on the inner circumference is coupled to the motor generator MG1, and the rotating shaft of the ring gear located on the outer circumference is coupled to the motor generator MG2. The rotating shaft of the planetary gear located between the sun gear and the ring gear is coupled to the engine 200, and the rotation of the engine 200 is transmitted by the planetary gear and then by the pinion gear to the sun gear and the ring gear. Thus, the power split mechanism is configured such that the power of the engine 200 is split between two systems. In the hybrid vehicle 10, the rotating shaft of the ring gear is coupled to the axle 11 in the hybrid vehicle 10, and the drive power is transmitted to the wheels 12 through the axle 11.

The inverter 400 is configured to be capable of converting the DC power taken out from the battery 500 into AC power and supplying the converted power to the motor generator MG1 and the motor generator MG2, and also converting the AC power generated by the motor generator MG1 and the motor generator MG2 into DC power and supplying the converted power to the battery 500. The inverter 400 may be configured as part of the so-called power control unit (PCU).

The battery 500 is a chargeable storage battery configured to be capable of functioning as a power supply source that supplies power for actuating the motor generator MG1 and the motor generator MG2.

The battery 500 may be charged by receiving the supply of power from a power supply located outside of the hybrid vehicle 10. In other words, the hybrid vehicle 10 may be the so-called plug-in hybrid vehicle.

The SOC sensor 510 is configured to be capable of detecting the residual battery capacity which indicates the SOC of the battery 500. The SOC sensor 510 is electrically connected to the ECU 100, and the SOC value of the battery 500 that has been detected by the SOC sensor 510 is received by the ECU 100 at all times.

The ECU 100 constitutes an example of the "display device" of the invention and is an electronic control unit configured to be capable of controlling the operation of the entire hybrid vehicle 10. The ECU 100 is provided with, for example, a central processing unit (CPU), a read only memory (ROM), and a random access memory (RAM).

The ECU 100 is provided with a zone setting unit 101 which is a specific example of the "first setting means" and "second setting means", a state acquisition unit 102, and a display control unit 103 which is a specific example of the "display means", as physical electronic circuits or logical processing blocks provided inside thereof.

The zone setting unit 101 sets (in other words, prepares) a fuel-efficient induction zone 710 (see FIG. 13($a$) to FIG. 13($f$) and subsequent drawings) that directly or indirectly indicates the contents of operations to be performed by the driver of the hybrid vehicle 10. The fuel-efficient induction zone 710 will be described hereinbelow in greater detail with reference to, for example, FIG. 2($a$) and FIG. 2($b$).

The state acquisition unit 102 acquires parameters that indicate the present operation state of the hybrid vehicle 10. Examples of the parameters acquired by the state acquisition unit 102 include the speed of the hybrid vehicle 10 and the output of the hybrid vehicle 10. The state acquisition unit 102 may also directly acquire those parameters from various sensors (not depicted in the drawings). Alternatively, the state acquisition unit 102 may indirectly acquire those parameters by calculations based on the parameters acquired from the sensors (not depicted in the figures).

The display control unit 103 controls the display 700 such as to display the fuel-efficient induction zone 710, which has been set by the zone setting unit 101, and a present state indicator 720 (see, for example, FIG. 5) indicating the parameters (in other words, the present operation state of the hybrid vehicle 10) that have been acquired by the state acquisition unit 102. Examples of displays suitable as the display 700 include liquid crystal displays, head-up displays, and displays of other systems.

(2) First Embodiment of Fuel-Efficient Induction Zone and Present State Indicator The first embodiment of the fuel-efficient induction zone 710 and present state indicator 720 will be explained hereinbelow with reference to FIGS. 2($a$) to 12.

(2-1) Fuel-Efficient Induction Zone

The first embodiment of the fuel-efficient induction zone 710 which is set by the zone setting unit 101 will be explained hereinbelow with reference to FIGS. 2(*a*) to 4(*c*). FIG. 2(*a*) and FIG. 2(*b*) depict a graph and a table, respectively, illustrating an example of grounds for setting the fuel-efficient induction zone 710 of the first embodiment. FIG. 3(*a*) and FIG. 3(*b*) are graphs illustrating an example of the fuel-efficient induction zone 710 of the first embodiment. FIG. 4(*a*), FIG. 4(*b*) and FIG. 4(*c*) are graphs illustrating another example of the fuel-efficient induction zone 710 of the first embodiment.

Initially, in the first embodiment, the fuel-efficient induction zone 710 is a display object that indirectly displays the operations, which are recommended to be performed by the driver, by using the format of speed and output of the hybrid vehicle 10.

It is preferred that the fuel-efficient induction zone 710 be set from the standpoint of improving (preferably, optimizing) the actual fuel consumption (for example, the fuel consumption calculated from the distance traveled by the hybrid vehicle 10 within a period in which the operations such as included in the fuel-efficient induction zone 710 are performed and from the amount of fuel injected within this period) of the hybrid vehicle 10 that travels correspondingly to the fuel-efficient induction zone 710. In other words, it is preferred that the fuel-efficient induction zone 710 be set from the standpoint of improving the actual fuel consumption of the hybrid vehicle 10 that travels correspondingly to the fuel-efficient induction zone 710 over the actual fuel consumption of the hybrid vehicle 10 that travels not correspondingly to the fuel-efficient induction zone 710. More specifically, it is preferred that the fuel-efficient induction zone 710 be set from the standpoint of improving (preferably, optimizing) the actual fuel consumption of the hybrid vehicle 10 that travels as a result of performing the operations such that the speed and output of the hybrid vehicle 10 are included in the fuel-efficient induction zone 710. In other words, it is preferred that the fuel-efficient induction zone 710 be set from the standpoint of improving the actual fuel consumption of the hybrid vehicle 10 that travels as a result of performing the operations such that the speed and output of the hybrid vehicle 10 are included in the fuel-efficient induction zone 20, 710 over the actual fuel consumption of the hybrid vehicle 10 that travels as a result of performing the operations such that the speed and output of the hybrid vehicle 10 deviate from the fuel-efficient induction zone 710. Thus, it is preferred that the fuel-efficient induction zone 710 be set with an emphasis on the actual fuel consumption rather than instantaneous fuel consumption (for example, fuel consumption calculated from the vehicle speed and fuel injection amount at the point of time the instantaneous fuel consumption is calculated).

When the fuel-efficient induction zone 710 is set with emphasis on the actual fuel consumption, it is preferable to take into account that "the actual fuel consumption when the hybrid vehicle 10 travels through the same distance over the same travel time can change depending on the acceleration of the hybrid vehicle 10". Further, when the fuel-efficient induction zone 710 is set with emphasis on the actual fuel consumption, it is also preferable to take into account that "the acceleration at which the actual fuel consumption becomes optimal does not necessarily match the acceleration at which the instantaneous fuel consumption becomes optimal". The results of simulation indicating that the acceleration at which the actual fuel consumption becomes optimal is present are described hereinbelow.

FIG. 2(*a*) depicts a running pattern of the hybrid vehicle 10 which is used in the simulation indicating that the acceleration at which the actual fuel consumption becomes optimal is present. In the simulation, as depicted in FIG. 2(*a*), the hybrid vehicle 10 starts moving at a timing t1 and then stops at a red light at a timing t2. Then, the hybrid vehicle 10 again starts moving at a green light at a timing t3. Accelerations of seven types, namely, 0.3 m/s$^2$, 0.4 m/s$^2$, 0.5 m/s$^2$, 0.6 in/s$^2$1.0 m/s$^2$, 1.4 m/s$^2$, and 1.8 m/s$^2$, were used as the acceleration of the hybrid vehicle 10 when the vehicle started moving again. At a target speed (40 km/h in FIG. 2(*a*)) corresponding to the cruise speed, the hybrid vehicle 10 is assumed to nm steadily for a constant period of time. Then, the hybrid vehicle 10 is assumed to stop again at a timing t4. The deceleration of the hybrid vehicle 10 at the time the vehicle stops again is assumed to increase with the decrease in the acceleration when the vehicle starts moving again at the timing t3. In other words, in the simulation, the period of time in which the hybrid vehicle 10 runs steadily (more specifically, the period of time from after the vehicle starts moving till it stops) is assumed to be constant regardless of changes in acceleration. Then, the hybrid vehicle 10 is assumed to reach the target destination, while repeating start and stop operations caused by traffic congestion, and then stop.

Such simulation has been conducted not only for the case in which the target speed of the steadily running vehicle was 40 km/h, but also with respect to the case in which the target speed of the steadily running vehicle was 60 km/h and the case in Which the target speed of the steadily running vehicle was 80 km/h.

FIG. 2(*b*) shows the actual fuel consumption obtained as a result of the simulation (in other words, the actual fuel consumption of the hybrid vehicle 10 that has been running according to the above-described running pattern). FIG. 2(*b*) depicts indirectly the actual fuel consumption obtained as a result of the simulation, by using a fuel consumption variation rate referred to the actual fuel consumption in the case in which the acceleration when the vehicle runs steadily is 0.3 m/s$^2$. As depicted in FIG. 2(*b*), the fuel consumption variation rate is the largest when the acceleration is 0.6 m/s$^2$, and therefore the actual fuel consumption is the lowest when the acceleration is 0.6 m/s$^2$. One of the reasons why the actual fuel consumption is optimal when the acceleration is 0.6 m/s$^2$ is that when the acceleration is 0.6 m/s$^2$, the period of time in which the engine 200 is stopped (in other words, the period of time in which the vehicle runs in a EV running mode in which only the drive power of the motor generator MG2 is used) increases due to the shortening of the interval of time required to start the steady running other words, the interval of time required for acceleration). Actually, the simulation results indicate that the interval of time in which the engine 200 is stopped when the acceleration is 0.6 m/s$^2$ is longer than the interval of time in which the engine 200 is stopped when the acceleration is 0.3 m/s$^2$ and the interval of time in which the engine 200 is stopped when the acceleration is 1.8 m/s$^2$. Yet another reason why the actual fuel consumption is optimal when the acceleration is 0.6 m/s$^2$ is that thermal efficiency of the engine 200 increases with the increase in acceleration. However, when the acceleration becomes too high, the actual fuel consumption is increased because an exhaust gas recirculation (EGR) is off.

In order to discuss the results of such simulation, it is estimated that the actual fuel consumption when the hybrid vehicle 10 travels through the same distance in the same running time becomes optimal when a shift to a steady running is made after encouraging a certain aggressive acceleration, while allowing the degradation of instantaneous fuel consumption. Therefore, in the embodiment, it is preferred that the fuel-efficient induction zone 710 be set with the object of improving (for example, optimizing) the actual fuel consumption with consideration for the fact that the actual fuel consumption when the hybrid vehicle 10 travels through the same distance in the same running time changes depending on the acceleration of the hybrid vehicle 10 and the acceleration at which the actual fuel consumption is optimal and the acceleration at which the instantaneous fuel consumption is optimal do not necessarily match.

More specifically, as depicted in FIG. 3(*a*), the zone setting unit 101 sets the fuel-efficient induction zone 710 which is defined, for example, on a graph in which the vehicle speed is plotted against the abscissa and the output is plotted against the ordinate. The driver operates the accelerator, or the like, by referring to the fuel-efficient induction zone 710, such that the speed and output of the hybrid vehicle 10 are included in the fuel-efficient induction zone 710. In other words, the fuel-efficient induction zone 710 indirectly indicates the operation amount of the accelerator to be performed by the driver in order to improve the actual fuel efficiency.

Such fuel-efficient induction zone 710 is set by the zone setting unit 101 with consideration for the issues explained hereinbelow.

The fuel-efficient induction zone 710 is provided with an acceleration recommended zone 711 which is a specific example of "a first operation amount" and "a first operation range", a steady running shift zone 712 which is a specific example of "a second operation amount" and "a second operation range", and an electronic vehicle (EV) running zone 713 which is a specific example of "a desired operation state".

The acceleration recommended zone 711 is a zone indirectly indicating the contents of operations to be performed by the driver when the vehicle speed is relatively low (for example, in the examples depicted in FIG. 3(*a*) and FIG. 3(*b*), the speed below the lower limit of the target vehicle speed). Therefore, when the vehicle speed is relatively low, the driver operates the accelerator, or the like, such that the vehicle speed and output of the hybrid vehicle 10 are included in the acceleration recommended zone 711.

The acceleration recommended zone 711 is preferably set such as to suggest that the output also should be increased (for example, the depression amount of the accelerator should be increased) as the vehicle speed increases. In other words, it is preferred that the acceleration recommended zone 711 be set such that the average value of the output included in the acceleration recommended zone 711 corresponding to a certain vehicle speed is greater than the average value of the output included in the acceleration recommended zone 711 corresponding to a vehicle speed which is lower than the certain vehicle speed.

Furthermore, the acceleration recommended zone 711 may be set according to a fuel consumption contour line. More specifically, in the example depicted in FIG. 3(*b*), the central line of the acceleration recommended zone 711 (more specifically, a virtual line positioned between the upper edge of the acceleration recommended zone 711 and the lower edge of the acceleration recommended zone 711) corresponds to the fuel consumption contour (in FIG. 3(*b*). "FUEL CONSUMPTION CONTOUR (OPTIMAL)") in the case in which the hybrid vehicle 10 travels with an acceleration (for example, 0.6 m/s$^2$ in the simulation illustrated by FIGS. 2(*a*) and 2(*b*)) at which the actual consumption of fuel consumed when the vehicle travels through the same distance in the same travel time becomes optimal. Further, in the example depicted in FIG. 3(*b*), the upper edge of the acceleration recommended zone 711 (in other words, a line connecting the upper limit values of the acceleration recommended zone 711 at different vehicle speeds) corresponds to a fuel consumption contour (in FIG. 3(*b*), "FUEL CONSUMPTION CONTOUR (UPPER. LIMIT)") which is positioned on the side where the output increases with respect to the "FUEL CONSUMPTION CONTOUR (OPTIMAL)" corresponding to the central line of the acceleration recommended zone 711. More specifically, in the example depicted in FIG. 3(*b*), the upper edge of the acceleration recommended zone 711 corresponds to the fuel consumption contour (in FIG. 3(*b*), "FUEL CONSUMPTION CONTOUR (UPPER LIMIT)") in the case in which the hybrid vehicle 10 travels with an acceleration (for example, 0.9 m$^2$/s) obtained by adding a margin of a predetermined amount to the acceleration at which the actual consumption of fuel consumed when the vehicle travels through the same distance in the same travel time becomes optimal. Meanwhile, in the example depicted in FIG. 3(*b*), the lower edge of the acceleration recommended zone 711 (in other words, a line connecting the lower limit values of the acceleration recommended zone 711 at different vehicle speeds) corresponds to a fuel consumption contour (in FIG. 3(*b*), "FUEL CONSUMPTION CONTOUR (LOWER LIMIT)") which is positioned on the side where the output decreases with respect to the "FUEL CONSUMPTION CONTOUR (OPTIMAL)" corresponding to the central line of the acceleration recommended zone 711. More specifically, in the example depicted in FIG. 3(*b*), the lower edge of the acceleration recommended zone 711 corresponds to the fuel consumption contour (in FIG. 3(*b*), "FUEL CONSUMPTION CONTOUR (LOWER LIMIT)") in the case in which the hybrid vehicle 10 travels with an acceleration (for example, 0.3 m$^2$/s) obtained by subtracting a margin of a predetermined amount from the acceleration at which the actual fuel consumption realized when the vehicle travels through the same distance in the same travel time becomes optimal.

Further, it is preferred that the acceleration recommended zone 711 be set to be positioned on the side where the output increases with respect to the running pattern ("FLAT ROAD" in FIG. 3(*b*)) in the case in which the hybrid vehicle 10 is assumed to travel on a flat road while maintaining the operation state in which the instantaneous fuel consumption is optimal. In other words, it is preferred that the acceleration recommended zone 711 be set such as to suggest the operations that can further encourage the acceleration of the hybrid vehicle 10 in comparison with the case in which the instantaneous fuel consumption is optimal.

Furthermore, the acceleration recommended zone 711 may be set such as not to fall below the END start threshold (OFF→ON) corresponding to the output at a point of time at which the engine 200 in a stop state is started.

In addition, the acceleration recommended zone 711 may be set such as to correspond to a vehicle speed that is less than the lower limit of the target vehicle speed (in other words, such that does not correspond to a vehicle speed that is equal to or higher than the lower limit of the target vehicle speed). In this case, the lower limit of the target vehicle, speed indicates the lower limit of the allowed range of the target vehicle speed when the hybrid vehicle 10 performs a steady running. Meanwhile, the upper limit of the target vehicle speed indicates the upper limit of the allowed range of the target vehicle speed when the hybrid vehicle 10 performs a steady running. The width between the upper limit of the target vehicle speed and the lower limit of the target vehicle speed may be adjusted, as appropriate, for example, according to the slope of the road through which the hybrid vehicle 10 travels. For example, the width between the upper limit of the target vehicle speed and the lower limit of the target vehicle speed may be adjusted, as appropriate, for example, such as to increase with the increase in the slope of the road through which the hybrid vehicle 10 travels.

Further, the acceleration recommended zone 711 may be set such as not to exceed the upper limit of the target output which is the upper limit of the target value of the output of the hybrid vehicle 10. The upper limit of the target output means an output such that where the accelerator pedal is depressed to realize an output that exceeds the upper limit of the target output, the speed of the hybrid vehicle 10 exceeds the target vehicle speed.

Figure 3A:
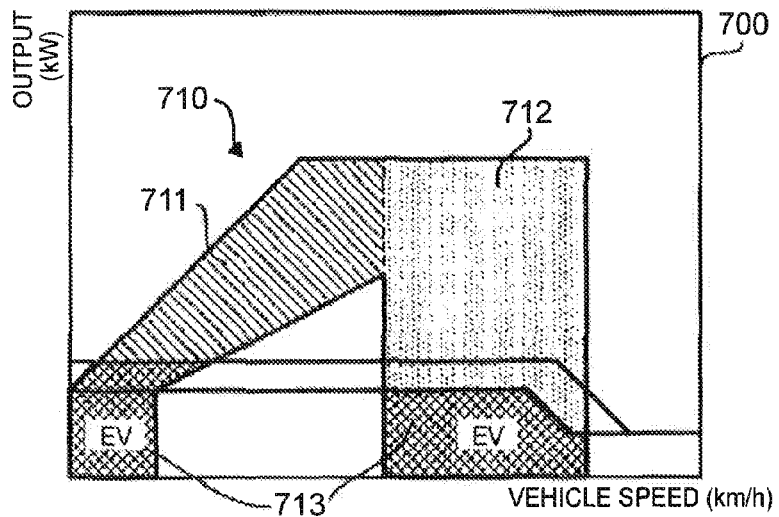
FIG. 3(a) and FIG. 3(b) are graphs illustrating an example of the fuel-efficient induction zone of the first embodiment.
Figure 3B:
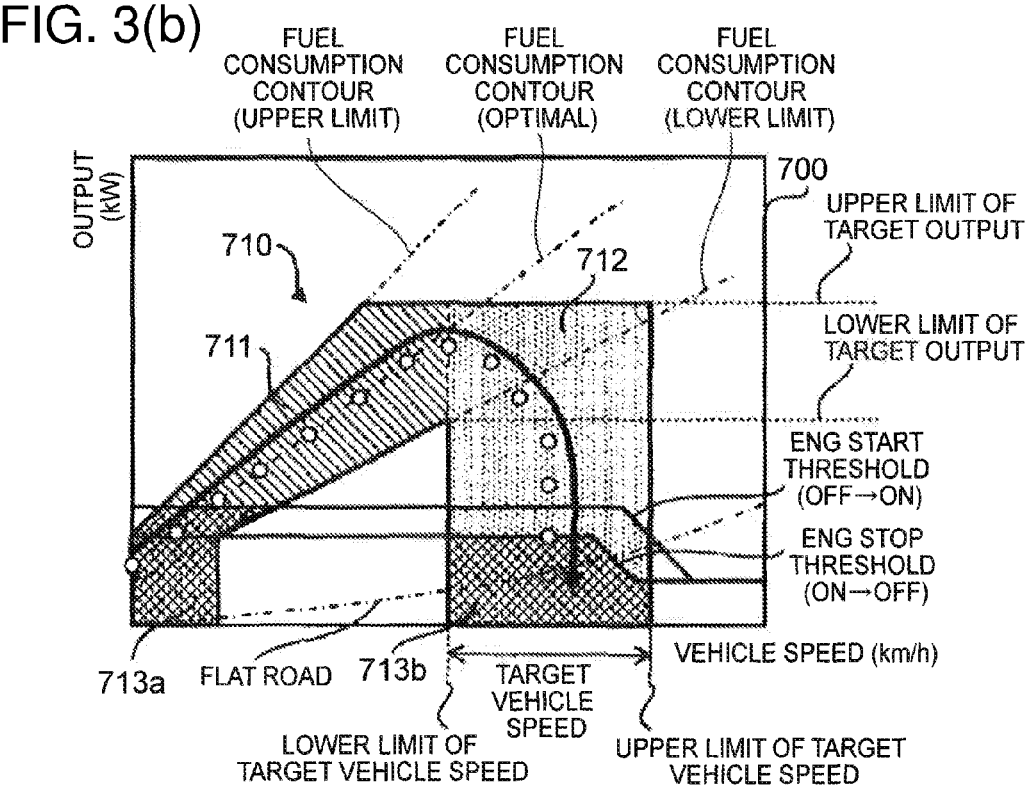

In summary, in the example depicted in FIG. 3(b), the acceleration recommended zone 711 corresponds to a region bounded by the ENG start threshold (OFF→ON), fuel consumption contour (upper limit), fuel consumption contour (lower limit), upper limit of target output, and lower limit of target output. When the vehicle speed is relatively small, as indicated by a bold arrow in FIG. 3(b), the driver operates the accelerator to accelerate aggressively with reference to such an acceleration recommended zone 711.

The steady running shift zone 712 is a zone indirectly indicating the contents of operations to be performed by the driver when the vehicle speed is relatively high (for example, in the examples depicted in FIG. 3(a) and FIG. 3(b), the speed equal to or above the lower limit of the target vehicle speed). Therefore, when the vehicle speed is relatively high, the driver operates the accelerator, or the like, such that the vehicle speed and output of the hybrid vehicle 10 are included in the steady running shift zone 712.

The steady running shift zone 712 is preferably set such as to suggest that the output may be decreased (for example, the depression amount of the accelerator may be decreased) while maintaining the vehicle speed. It is also preferred that the steady running shift zone 712 be set such as to suggest that the EV running zone 713 in which the vehicle runs in the EV running mode can be eventually reached by decreasing the output. Therefore, it is preferred that the steady running shift zone 712 be adjacent to the EV running zone 713, the boundary therebetween being the ENG stop threshold (ON→OFF) corresponding to the output at a point of time at which the engine 200 in a drive state is stopped.

In addition, the steady running shift zone 712 may be set such as to correspond to a vehicle speed that is equal to or higher than the lower limit of the target vehicle speed and lower than the upper limit of the target vehicle speed (in other words, such that does not correspond to a vehicle speed that is less than the lower limit of the target vehicle speed and equal to or higher than the upper limit of the target vehicle speed).

Further, the steady running shift zone 712 may be set, similarly to the acceleration recommended zone 711, such as not to exceed the upper limit of the target output which is the upper limit of the target value of the output of the hybrid vehicle 10.

In summary, in the example depicted in FIG. 3(b), the steady running shift zone 712 corresponds to a region bounded by the upper limit of target output, lower limit of target output, upper limit of target vehicle speed, and ENG stop threshold (ON→OFF). When the vehicle speed is relatively high, as indicated by an arrow in FIG. 3(b), the driver operates the accelerator such as to reduce the output while maintaining the vehicle speed (and initiate running in the EV running mode), with reference to such a steady running shift zone 712.

The EV running zone 713 is a zone indicating an operation state in which the hybrid vehicle 10 can run in the EV running mode (more specifically, the operation state specified from the vehicle speed and output). The EV running zone is a region positioned on the side where the output decreases with respect to at least either one of the ENG start threshold (OFF→ON) and the ENG stop threshold (ON→OFF). In the example depicted in FIG. 3(b), an EV running zone 713a which is adjacent to the acceleration recommended zone 711 and an EV running zone 713b which is adjacent to the steady running shift zone 712 coexist.

A region between the EV running zone 713a and the EV running zone 713b is substantially also a region including the operation state in which the hybrid vehicle 10 can run in the EV running mode. However, as mentioned hereinabove, from the standpoint of improving the actual fuel consumption when the hybrid vehicle 10 travels through the same distance in the same travel time, it is preferred not to run the hybrid vehicle 10 in the operation state included in the region between the EV running zone 713a and the EV running zone 713b. Therefore, in the first embodiment, the region between the EV running zone 713a and the EV running zone 713b may not be displayed as the EV running zone 713. However, the region between the EV running zone 713a and the EV running zone 713b may be displayed as the EV running zone 713.

Further, in order to encourage an aggressive transition to the EV running zone 713, for example, an "EV" label which clearly indicates the zone in which running in the EV running mode is possible may be displayed, as depicted in FIG. 3(a), in the EV running zone 713.

Such a fuel-efficient induction zone 710 typically can be uniquely defined by, for example, specifications of the hybrid vehicle 10 for each hybrid vehicle 10. Therefore, the fuel-efficient induction zone 701 may be defined in advance for each hybrid vehicle 10. In this case, the zone setting unit 101 may, set the fuel-efficient induction zone 710 by storing the fuel-efficient induction zone 710 which has been defined in advance. Alternatively, the zone setting unit 101 may set the fuel-efficient induction zone 701 by defining the fuel-efficient induction zone 701 anew.

The zone setting unit 101 may also correct, as appropriate, the fuel-efficient induction zone 710 which has been defined in advance or anew.

For example, the zone setting unit 101 may correct, as appropriate, the fuel-efficient induction zone 710 according to the SOC of the battery 500. For example, where the SOC is relatively small, an environment is presumed in which it is more difficult for the hybrid vehicle 10 to run the EV running node (in other words, it is preferred that the engine 200 be driven to charge the battery 500 than to run the vehicle in the EV running mode) than in the case in which the SOC is relatively large. Therefore, in such a case, the acceleration recommended zone 711 and the steady running shift zone 712 in which the engine 200 is driven may be corrected, as appropriate, such that the period of which the engine 200 is driven is extended.

Alternatively, for example, the zone setting unit 101 may correct, as appropriate, the fuel-efficient induction zone 710 according to the slope of the road on which the hybrid vehicle 10 travels. For example, when the road slope is relatively large, the output for realizing the same vehicle speed tends to increase over that in the case of a small road slope. Therefore, in this case, the fuel-efficient induction zone 710 may be corrected, as appropriate, such that the scale, in the ordinate direction, of the fuel-efficient induction zone 710 corresponding to the output be become larger as the slope of the road becomes greater (in other words, for example, the acceleration recommended zone 711 be enlarged along the ordinate direction).

Figure 4A:
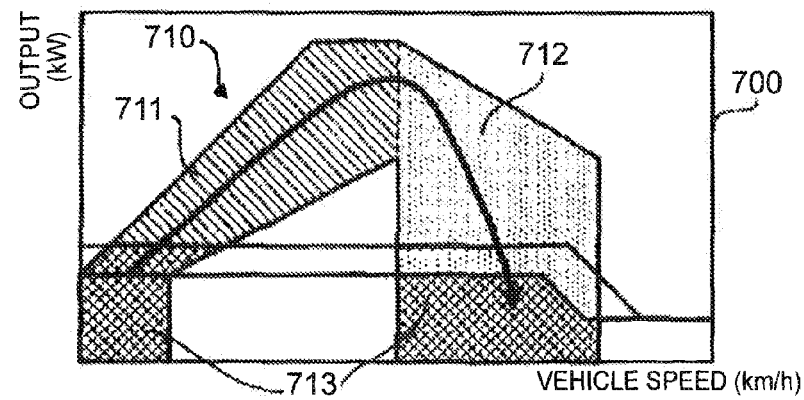
FIG. 4(a), FIG. 4(b) and FIG. 4(c) are graphs illustrating another example of the fuel-efficient induction zone of the first embodiment.
Figure 4B:
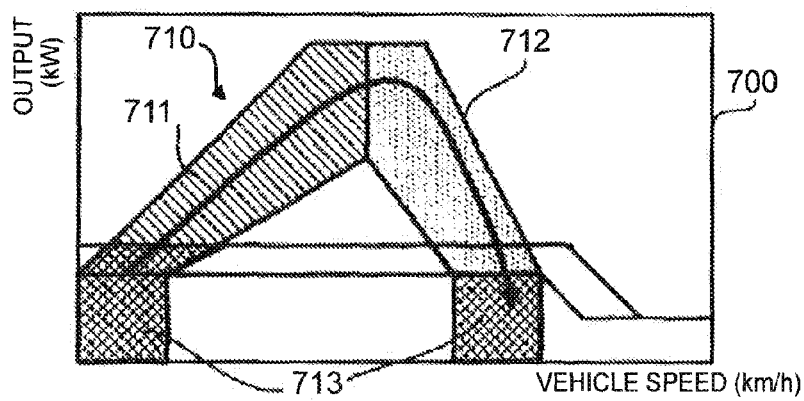
Figure 4C:
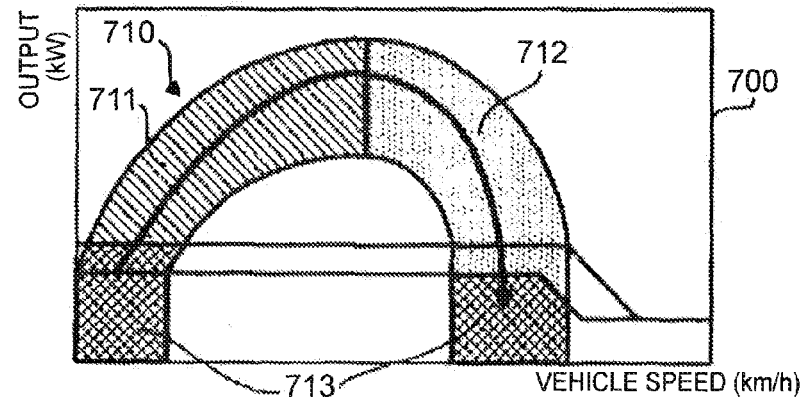

The fuel-efficient induction zone 710 depicted in FIG. 3(a) and FIG. 3(b) is merely an example. Therefore, the fuel-efficient induction zone 710 is not limited to the fuel-efficient induction zone 710 of the form depicted in FIG. 3(a) and FIG. 3(b). For example, the fuel-efficient induction zone 710 in which the upper edge of the steady running shift zone 712 decreases gradually according to the increase in the vehicle speed may be used to emphasize the preference of decreasing the output in the steady running shift zone 712, as depicted in FIG. 4(a). Alternatively, the fuel-efficient induction zone 710 including the steady running shift zone 712, which suggests that the output is to be reduced as the vehicle speed increases, may be used to emphasize the preference of decreasing the output in the steady running shift zone 712, as depicted in FIG. 4(b). Alternatively, the fuel-efficient induction zone 710 including the acceleration recommended zone 711 and the steady running shift zone 712, which have curved or circular-arc upper edge and lower edge, may be used to emphasize the preference of decreasing the output in the steady running shift zone 712, as depicted in FIG. 4(c). Essentially, any fuel-efficient induction zone 710 may be used, provided that it is possible to encourage aggressive acceleration when the vehicle speed is relatively low and encourage decreasing the output, while maintaining the vehicle speed, to start running in the EV running mode when the vehicle speed is relatively high.

Alternatively, one or a plurality of desired points (for example, white circles in FIG. 3(b)) inside the fuel-efficient induction zone 710 may be displayed in addition to, or instead of the zone (the so-called, area) such as the fuel-efficient induction zone 710. Further, one or a plurality of lines (for example, bold arrows in FIG. 3(b)) that pass through the desired positions in the fuel-efficient induction zone 710 may be displayed. In either case, the driver can improve the actual fuel consumption by performing the operations according to the points or lines. Essentially, any display object may be used as an alternative to the fuel-efficient induction zone 710, provided that it is possible to encourage aggressive acceleration when the vehicle speed is relatively low and encourage decreasing the output, while maintaining the vehicle speed, to start running in the EV running mode when the vehicle speed is relatively high.

(2-2) Present State Indicator

Figure 5:
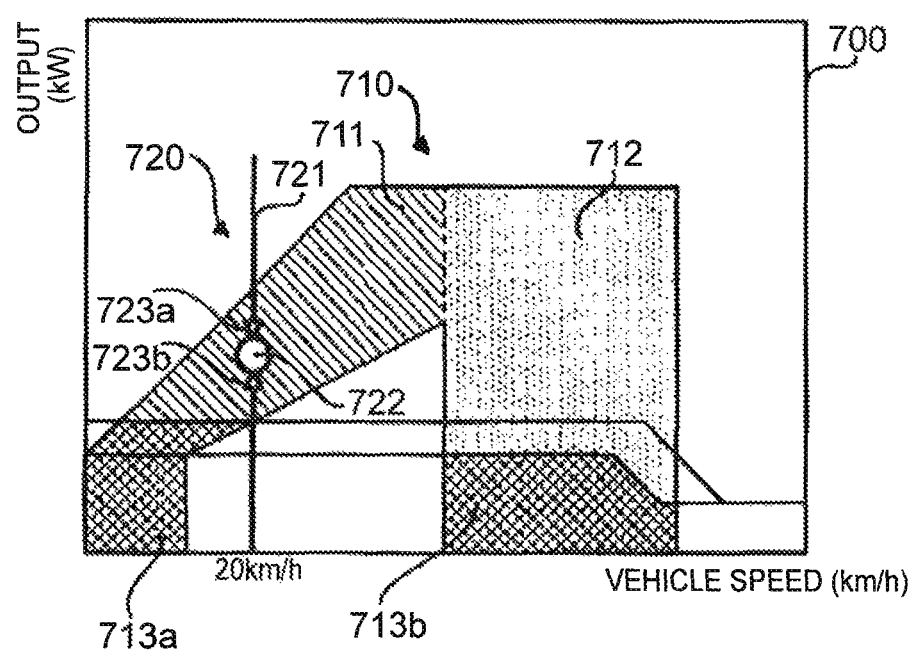
FIG. 5 is a plan view depicting a display example in the case in which the fuel-efficient induction zone of the first embodiment is displayed together with the present state indicator of the first embodiment.
Figure 6A:
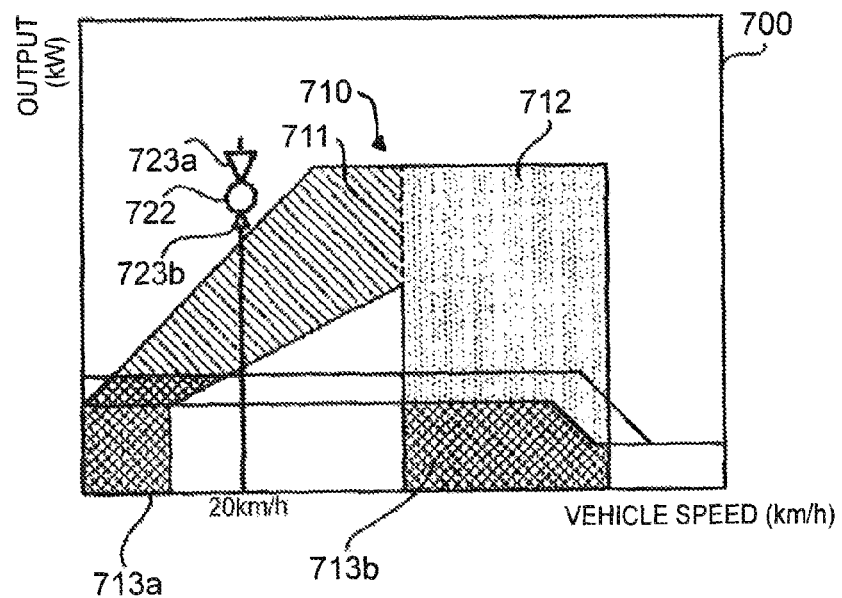
FIG. 6(a) and FIG. 6(b) are plan views depicting a display example in the case in which the fuel-efficient induction zone of the first embodiment is displayed together with the present state indicator of the first embodiment.
Figure 6B:
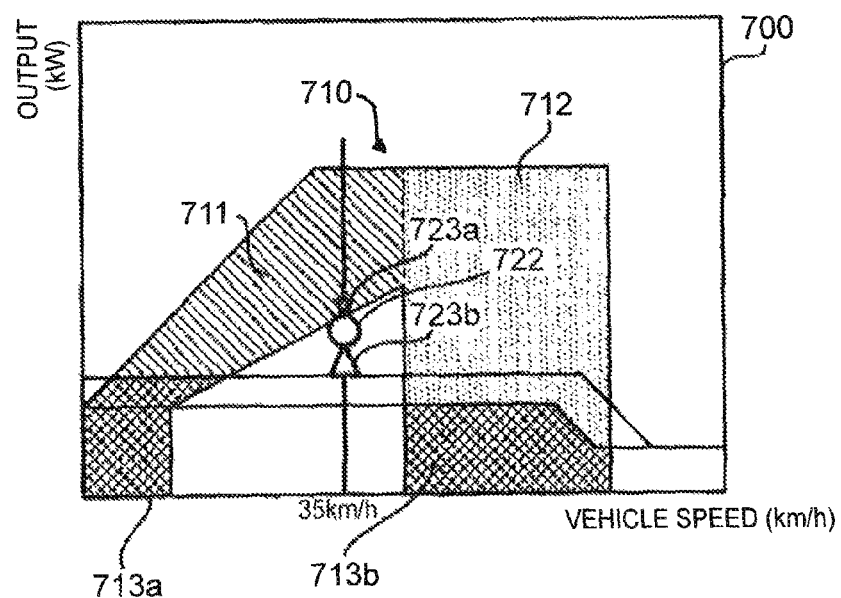

The first embodiment of the present state indicator 720 which indicates parameters representing the present operation state of the hybrid vehicle 10 that has been acquired by the state acquisition unit 102 will be explained hereinbelow with reference to FIGS. 5, 6(a) and 6(b). FIGS. 5, 6(a) and 6(b) are plan views illustrating display examples in which the present state indicator 720 of the first embodiment is displayed together with the fuel-efficient induction zone 710 of the first embodiment.

As depicted in FIG. 5, in the first embodiment, the fuel-efficient induction zone 710 which has been set by the zone setting unit 101 is displayed on the display 700 by operating the display control unit 103. The present state indicator 720 indicating the present operation state of the hybrid vehicle 10 which has been acquired by the state acquisition unit 102 is also displayed on the display 700.

As depicted in FIG. 5, the present state indicator 720 is provided with a speed line 721, an output marker 722, and excess-deficiency markers 723a and 723b which indicate the excess or deficiency of the present output of the hybrid vehicle 10.

The speed line 721 is a line extending along the ordinate and indicating the present speed of the hybrid vehicle 10. FIG. 5 shows an example of the speed line 721 indicating that the present speed of the hybrid vehicle 10 is 20 km/h. Where the present speed of the hybrid vehicle 10 increases, the speed line 721 moves to the right in FIG. 5. Meanwhile, where the present speed of the hybrid vehicle 10 decreases, the speed line 721 moves to the left in FIG. 5.

The output marker 722 is a marker indicating the present output of the hybrid vehicle 10. Where the present output of the hybrid vehicle 10 increases, the output marker 722 moves up in FIG. 5. Meanwhile, where the present output of the hybrid vehicle 10 decreases, the output marker 722 moves down in FIG. 5.

Further, the output marker 722 is positioned on the speed line 721. Therefore, the output marker 722 essentially can be said to indicate the present speed of the hybrid vehicle 10 in addition to the present output of the hybrid vehicle 10.

The present speed and present output of the hybrid vehicle 10 are the results of the hybrid vehicle 10 running according to the operation contents presently performed by the driver. Therefore, the output marker 722 essentially can be said to indicate indirectly, by using the format of vehicle speed and output, the operation contents presently performed by the driver The excess-deficiency markers 723a and 723b indicate the state of excess or deficiency of the present output of the hybrid vehicle 10. In other words, the excess-deficiency markers 723a and 723b indicate whether or not it is preferred that the present output of the hybrid vehicle 10 be decreased and whether or not it is preferred that the present output of the hybrid vehicle 10 be increased.

More specifically, for example, FIG. 6(a) illustrates an example in which the output marker 722 has deviated toward the output increase side with respect to the fuel-efficient zone 710. In other words, in this example, the present output of the hybrid vehicle 10 is greater than the output indicated by the fuel-efficient induction zone 710. In this case, for example, since the excess-deficiency marker 723a positioned above the output marker 722 (in other words, on the output increase side) becomes larger than the excess-deficiency marker 723b positioned below the output marker 722 (in other words, on the output decrease side), it may suggest that it is preferred that the present output of the hybrid vehicle 10 be decreased. In this case, the driver can decrease the present output of the hybrid vehicle 10 by decreasing the depression amount of the accelerator.

Alternatively, for example, FIG. 6(b) illustrates an example in which the output marker 722 has deviated toward the output decrease side with respect to the fuel-efficient zone 710. In other words, in this example, the present output of the hybrid vehicle 10 is less than the output indicated by the fuel-efficient induction zone 710. In this case, for example, since the excess-deficiency marker 723a positioned above the output marker 722 (in other words, on the output increase side) becomes less than the excess-deficiency marker 723b positioned below the output marker 722 (in other words, on the output decrease side), it may suggest that it is preferred that the present output of the hybrid vehicle 10 be increased. In this case, the driver can increase the present output of the hybrid vehicle 10 by increasing the depression amount of the accelerator.

Since the present state indicator 720 is thus displayed together with the fuel-efficient induction zone 710, the driver can accurately recognize whether or not the present operation performed by the driver himself can result in the speed and output of the hybrid vehicle 10 being included in the fuel-efficient induction zone 710. In other words, the driver can accurately recognize which operation is to be performed to improve the actual fuel consumption.

The present state indicator 720 depicted in FIGS. 5, 6(a) and 6(b) is merely an example. Therefore, the present state indicator 720 is not limited to the present state indicator 720 of the form depicted in FIGS. 5, 6(a) and 6(b). Essentially any displayed object capable of indicating in some form the present operation state of the hybrid vehicle 10 (for example, at least the vehicle speed and output) may be used as the present state indicator 720.

(2-3) Specific Examples of Display Form of Fuel-Efficient Induction Zone and Present State Indicator Specific examples of the display form of the fuel-efficient induction zone 710 and the present state indicator 720 within a period of time from the stop state of the hybrid vehicle 10 till the vehicle starts running steadily in the EV running mode will be explained hereinbelow with reference to FIGS. 7 to 12. FIGS. 7 to 12 are plan views illustrating the transition of the display form of the fuel-efficient induction zone 710 and the present state indicator 720 within a period of time from the stop state of the hybrid vehicle 10 till the vehicle starts running steadily in the EV running mode. In FIGS. 7 to 12, the reference numerals of the fuel-efficient induction zone 710 and the present state indicator 720 are omitted to make the drawings more clear.

Figure 7:
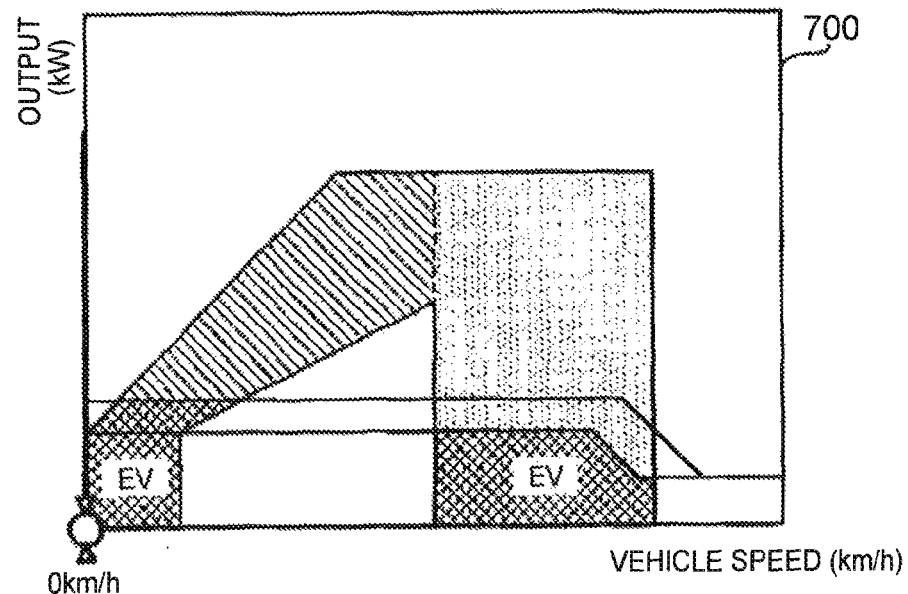
FIG. 7 is a plan view illustrating the transition of the display form of the fuel-efficient induction zone and present state indicator before the hybrid vehicle in a stop state starts running steadily in the EV running mode.

As depicted in FIG. 7, when the hybrid vehicle 10 is in the stop state, the present speed of the hybrid vehicle 10 is naturally 0 km/h. Therefore, the speed line 721 of the present state indicator 720 is displayed at a position of 0 km/h. Likewise, the present output of the hybrid vehicle 10 is naturally 0 kW. Therefore, the output marker 722 of the present state indicator 720 is displayed at a position of 0 kW on the speed line 721 indicating 0 km/h.

Figure 8:
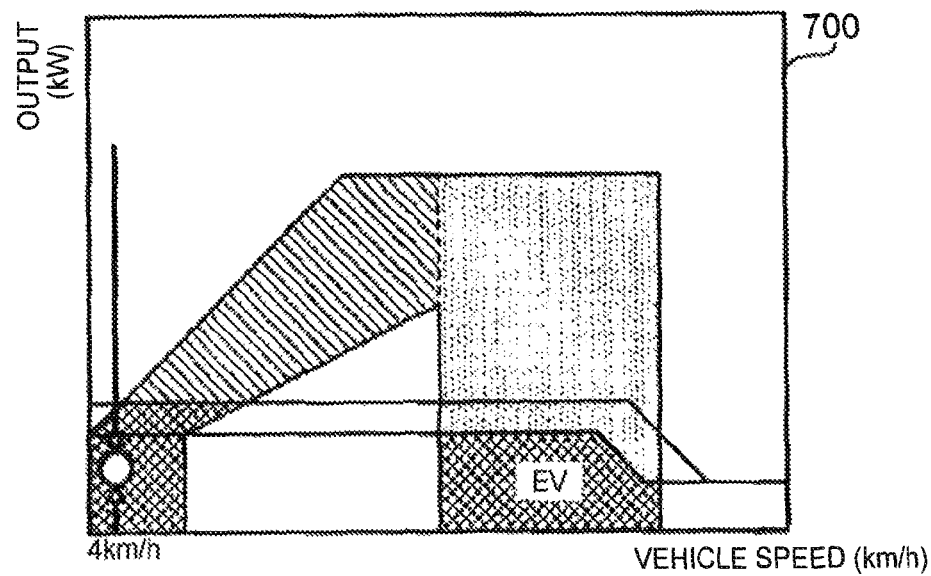
FIG. 8 is a plan view illustrating the transition of the display form of the fuel-efficient induction zone and present state indicator before the hybrid vehicle in a stop state starts running steadily in the EV running mode.
Figure 9:
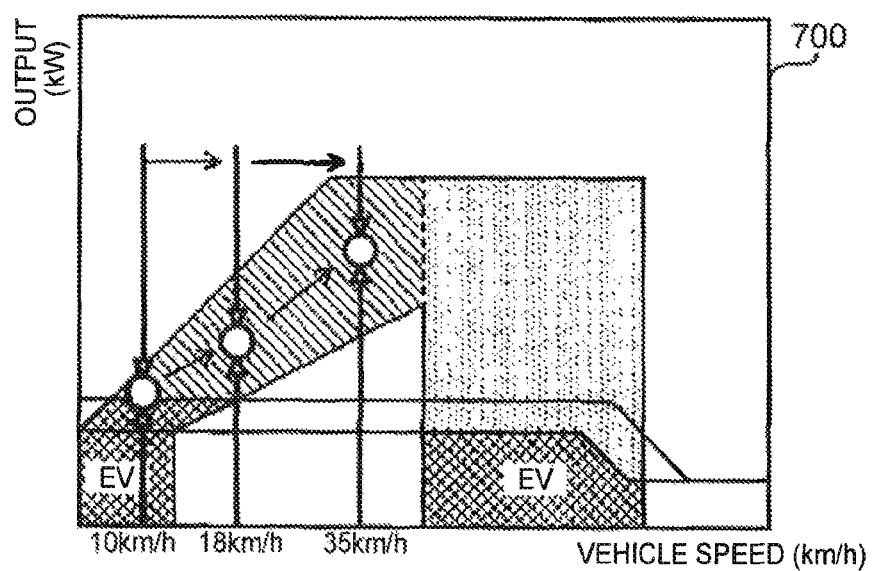
FIG. 9 is a plan view illustrating the transition of the display form of the fuel-efficient induction zone and present state indicator before the hybrid vehicle in a stop 25 state starts running steadily in the EV running mode.

Then, it is assumed that the hybrid vehicle 10 starts moving, as depicted in FIG. 8. In this case, the hybrid vehicle 10 runs for a certain time in the EV running mode by using only the drive power of the motor generator MG2. Therefore, the output marker 722 is displayed to be positioned inside the EV running zone 713a.

Where the output thereafter exceeds the ENG start threshold (OFF→ON) following the increase in the speed and output of the hybrid vehicle 10, as depicted in FIG. 9, the engine 200 is started. At this time, the display position of the output marker 722 makes a transition from the EV running zone 713 to the acceleration recommended zone 711 correspondingly to the increasing vehicle speed and output. The driver then operates the accelerator, as appropriate, such that the output marker 722 is included in the acceleration recommended zone 711. As a result, the speed line 721 and the output marker 722 move successively to the right in FIG. 9 as the vehicle speed increases. Likewise, the output marker 722 moves successively upward in FIG. 9 as the output increases.

In FIG. 9, a plurality of present state indicators 720 is displayed simultaneously in order to better illustrate the transition of the display form of the present state indicator 720. However, it is essentially preferred that only one present state indicator 720 corresponding to the present vehicle speed and output be displayed.

Figure 10A:
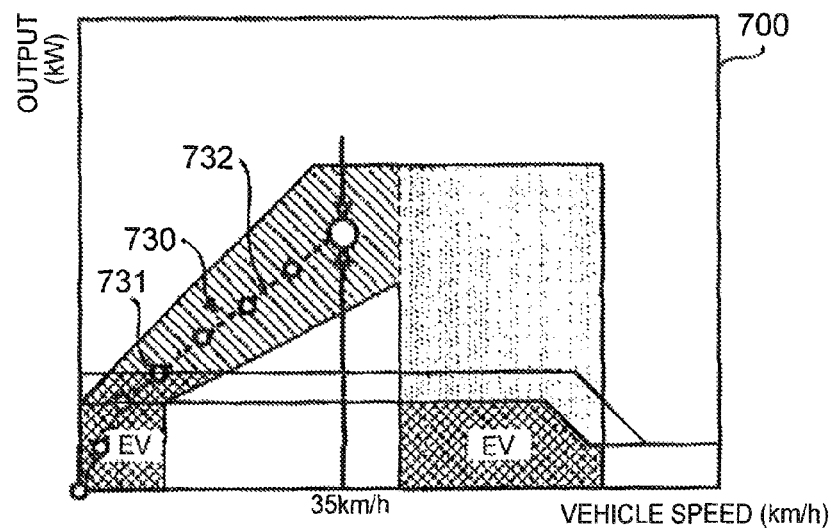
FIG. 10(a) and FIG. 10(b) are plan views illustrating the transition of the display form of the fuel-efficient induction zone and present state indicator before the hybrid vehicle in a stop state starts running steadily in the EV running mode.
Figure 10B:
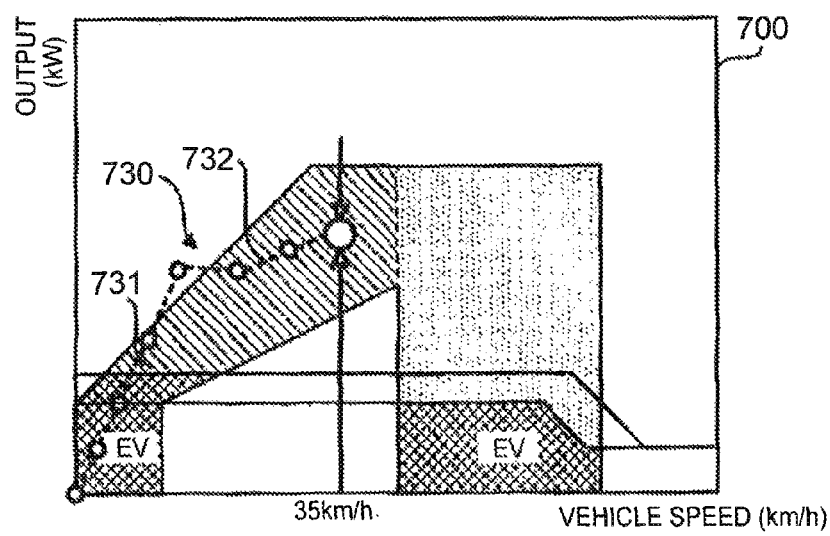

In this case, as depicted in FIGS. 10(a) and 10(b), the display control unit 103 may control the display 700 such as to display a history indicator 730 indicating the past positions (or a trajectory connecting the past positions) of the output marker 722. More specifically, as depicted in FIG. 10(a) and FIG. 10(b), the history indicator 730 includes past markers 731 indicating the positions of the output marker 722 at specific timings in the past and a past trajectory line 732 corresponding to the trajectory connecting the past markers 731. FIG. 10(a) shows the history indicator 730 in the case in which the driver has operated the accelerator such as to include the output marker 722 into the fuel-efficient induction zone 710. Meanwhile, FIG. 10(b) shows the history indicator 730 in the case in which the accelerator operation performed by the driver results in the deviation of the output marker 722 from the fuel-efficient induction zone 710.

The presence/absence of the display of the history indicator 730 may be switched, as appropriate, by the driver's instruction. In other words, the history indicator 730 may be displayed according to the driver's instruction to display the history indicator 730, or the history indicator 730 may be not displayed according to the driver's instruction not to display the history indicator 730.

Alternatively, the presence/absence of the display of the history indicator 722 may be switched, as appropriate, according to the speed of the hybrid vehicle 10 in order to facilitate the verification of the history indicator 722 by the driver. For example, the history indicator 722 may be displayed when the hybrid vehicle 10 has stopped (that is, the vehicle speed is 0 km/h), and the history indicator 722 may not be displayed when the hybrid vehicle 10 runs (that is, the vehicle speed is greater than 0 km/h). Alternatively, for example, the history indicator 722 may be displayed when the hybrid vehicle 10 starts moving slowly (that is, the vehicle speed is Less than 5 km/h), and the history indicator 722 may not be displayed when the hybrid vehicle 10 runs (that is, the vehicle speed is equal to or greater than 5 km/h). As a result, the driver can evaluate the operation contents performed by him in the past while the hybrid vehicle 10 is stopped.

Alternatively, in the steady running shift zone 712, it is suffice for the driver to reduce uniformly the depression amount of the accelerator, whereas in the acceleration recommended zone 711, it may be necessary for the driver to adjust finely the depression amount of the accelerator. In other words, the evaluation of the past operation contents of the driver is more important when the hybrid vehicle 10 runs such that the output marker 722 is included in the acceleration recommended zone 711 (for example, when the speed of the hybrid vehicle 10 is less than the lower limit of the target vehicle speed). Therefore, the presence/absence of the display of the history indicator 722 may be switched, as appropriate, according to whether or not the hybrid vehicle 10 travels such that the output marker 722 is included in the acceleration recommended zone 711. For example, the history indicator 722 may be displayed when the hybrid vehicle 10 travels such that the output marker 722 is included in the acceleration recommended zone 711 (for example, the vehicle speed is less than the lower limit of the target vehicle speed), whereas the history indicator 722 may not be displayed when the hybrid vehicle 10 travels such that the output marker 722 is included in the steady running shift zone 712 or the EV running zone 713 (for example, the vehicle speed is equal to or greater than the lower limit of the target vehicle speed).

The display form of the history indicator 722 may be also changed according to the matching degree of the history indicator 722 and the fuel-efficient induction zone 720. Further, the evaluation score corresponding to the matching degree of the history indicator 722 and the fuel-efficient induction zone 720 may be displayed together with the history indicator 722.

The history indicator 730 depicted in FIG. 10(*a*) and FIG. 10(*b*) are merely an example. Therefore, the history indicator 730 is not limited to the history indicator 730 of the form depicted in FIG. 10(*a*) and FIG. 10(*b*). Essentially any displayed object capable of indicating in some form the past position of the output marker 722 (for example, at least either one of the vehicle speed and output) may be used as the history indicator 730.

Figure 11:
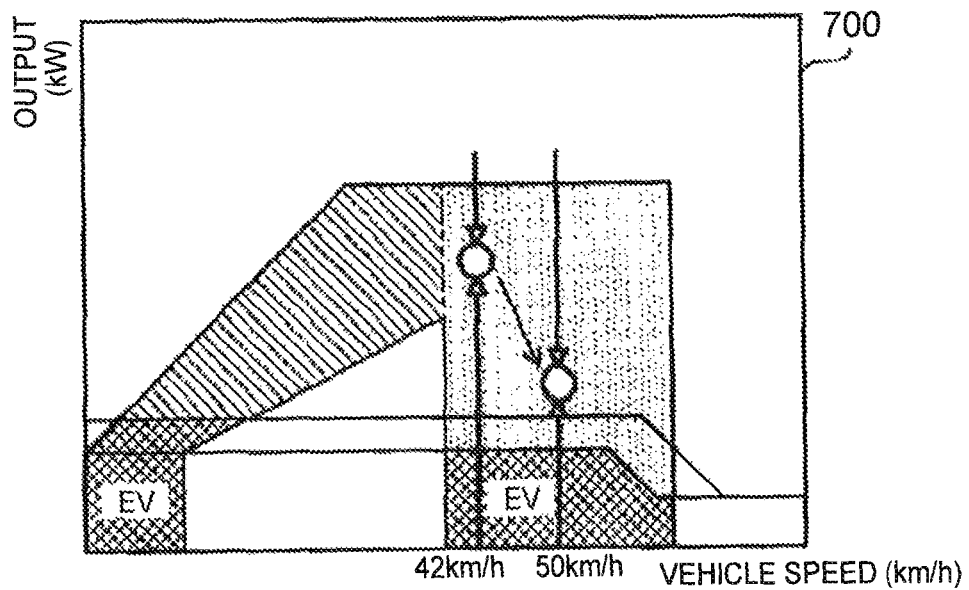
FIG. 11 is a plan view illustrating the transition of the display form of the fuel-efficient induction zone and present state indicator before the hybrid vehicle in a stop state starts running steadily in the EV running mode.

Then, as depicted in FIG. 11, as the speed and output of the hybrid vehicle 10 increase, the output marker 722 makes a transition from the acceleration recommended zone 711 into the steady running shift zone 712. As a result, the driver can recognize that the output of the hybrid vehicle 10 may be reduced by referring to the steady running shift zone 712. Therefore, the driver correspondingly reduces the depression amount of the accelerator. As a result, as depicted in FIG. 11, the output decreases while the speed of the hybrid vehicle 10 is maintained or is not changed significantly. The display position of the output marker 722 also changes according to such changes in the vehicle speed and output.

Figure 12:
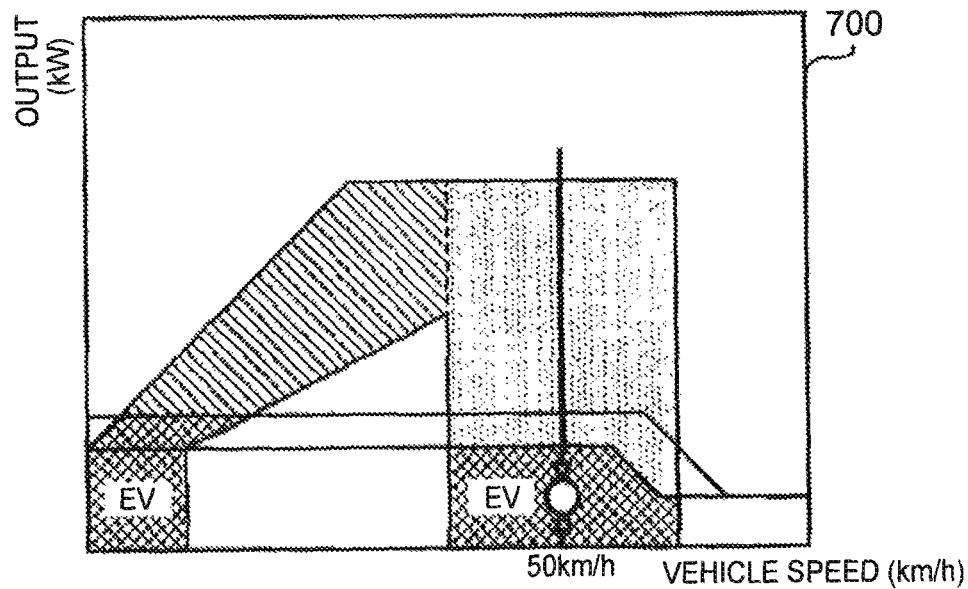
FIG. 12 is a plan view illustrating the transition of the display form of the fuel-efficient induction zone and present state indicator before the hybrid vehicle in a stop state starts running steadily in the EV running mode.

As depicted in FIG. 12, the driver can also recognize the presence of the EV running zone 713 below the steady running shift zone 712. Therefore, the driver can recognize that by further decreasing the output of the hybrid vehicle 10, it is possible to run the hybrid vehicle 10 in the EV running mode. The driver then reduces correspondingly the depression amount of the accelerator. As a result, the engine 200 stops when the output exceeds the ENG stop threshold (ON→OFF). Therefore, the hybrid vehicle 10 runs in the EV running mode in which the effect of improving the actual fuel consumption is the highest (the instantaneous fuel consumption is optimal). At this time, the display position of the output marker 722 makes a transition from the steady running shift zone 712 to the EV running zone 713.

Explained hereinabove is an example in which the entire fuel-efficient induction zone 710 is displayed on the display 700. However, at least part of the fuel-efficient induction zone 710 may be indicated to emphasize the vicinity of the region where the output marker 722 is presently positioned in the fuel-efficient induction zone 710 over the vicinity of the region where the output marker 722 is presently not positioned. For example, the vicinity of the region where the output marker 722 is presently positioned in the fuel-efficient induction zone 710 may be displayed, whereas the vicinity of the region where the output marker 722 is presently not positioned may not be displayed (that is, may be removed from the field of view of the driver). Alternatively, the vicinity of the region where the output marker 722 is presently positioned in the fuel-efficient induction zone 710 may be displayed as is, whereas the vicinity of the region where the output marker 722 is presently not positioned may be displayed with compression (that is, with reduction in size). The vicinity of the region where the output marker 722 is presently positioned in the fuel-efficient induction zone 710 may be displayed with enlargement, whereas the vicinity of the region where the output marker 722 is presently not positioned may be displayed as is.

Alternatively, only either one of the acceleration recommended zone 711 and the steady running shift mode 712 may be displayed according to the vehicle speed. For example, where the vehicle speed is less than a predetermined threshold (for example, the lower limit of the target vehicle speed), the acceleration recommended zone 711 may be displayed, whereas the steady running shill mode 712 may not be displayed. Where the vehicle speed is equal to or greater than a predetermined threshold (for example, the lower limit of the target vehicle speed), the acceleration recommended zone 711 may not be displayed, whereas the steady running shift mode 712 may be displayed.

Where it is considered that the operation performed by the driver such as to include the output marker 722 into the acceleration recommended zone 711 is more difficult than the operation performed by the driver such as to include the output marker 722 into the steady running shift mode 712, the display of the acceleration recommended zone 711 may be emphasized over that of the steady running shift mode 712.

As explained hereinabove, according to the first embodiment, the driver can operate the accelerator, or the like, while referring to the fuel-efficient induction zone 710 which encourages the improvement in the actual fuel consumption and the present state marker 720 indicating the present operation state of the hybrid vehicle 10. More specifically, the driver can operate the accelerator, or the like, such that the present state marker 720 is included in the fuel-efficient induction zone 710. In particular, the driver can intuitively recognize which operation to perform by referring to the fuel-efficient induction zone 710 and the present state marker 720. Therefore, the driver can advantageously perform the operations such that the actual fuel consumption of the hybrid vehicle 10 is advantageously improved.

Further, the driver can comparatively easily recognize the tendency of advantageous operations for improving the actual fuel efficiency because the fuel-efficient induction zone 710 includes the continuously displayed acceleration recommended zone 711 and the steady running shift zone 712. In other words, the driver can comparatively easily recognize the tendency of operations for improving the actual fuel consumption in the entire route from the start to acceleration and steady running.

More specifically, after the vehicle has started moving, the driver can initially perform the operations such as to accelerate aggressively the hybrid vehicle 10 (for example, can be encouraged to accelerate the vehicle to reach the target vehicle speed) by referring to the acceleration recommended zone 711, without paying any or almost any attention to the optimization of instantaneous fuel consumption. Then, the driver can perform the operations aimed to start running (steady running) in the EV running mode by referring to the steady running shift zone 712 and the EV running zone 713. In other words, the driver can shorten the period of time required for the hybrid vehicle 10 to start running steadily and extend the period of time in which steady running is continued. The resultant significant practical effect is that the actual fuel consumption of the hybrid vehicle 10 which runs according to the operations performed by the driver with reference to the fuel-efficient induction zone 710 is easily improved over the actual fuel consumption of the hybrid vehicle 10 which runs according to the operations performed by the driver without reference to the fuel-efficient induction zone 710.

In addition, where the history indicator 730 (see FIG. 10(*a*) and FIG. 10(*b*)) is displayed together with the fuel-efficient induction zone 710, the driver can advantageously evaluate the appropriateness of the operation of the accelerator, or the like, performed by the driver himself. As a result, the driver can advantageously learn the tendency of the operations for improving the actual fuel efficiency.

In the explanation hereinabove, the fuel-efficient induction zone 710 is defined by focusing on two parameters, namely, the vehicle speed and output. However, the fuel-efficient induction zone 710 may be also defined by focusing on any parameter that can directly or indirectly indicate the operation contents of the driver, in addition to the vehicle speed and output, or instead thereof. For example, the fuel-efficient induction zone 710 may be also defined by focusing on, for example, the depression amount of the accelerator, instead of the output. Alternatively, the fuel-efficient induction zone 710 may be also defined by focusing on, for example, the revolution speed of the propeller shaft (or the revolution speed of the motor generator MG2), instead of the vehicle speed.

(3) Second Embodiment of Fuel-Efficient Induction Zone and Present State Indicator The second embodiment of the fuel-efficient induction zone 710 and the present state indicator 720 will be explained hereinbelow with reference to FIG. 13(a) to FIG. 13(f). FIG. 13(a) to FIG. 13(f) are plan views illustrating a display example in the case in which the present state indicator 720 of the second embodiment is displayed together with the fuel-efficient induction zone 710 of the second embodiment.

In the first embodiment described hereinabove, the fuel-efficient induction zone 710 and the present state indicator 720 are displayed on two-dimensional coordinate axes having two axes corresponding to the vehicle speed and output. Meanwhile, in the second embodiment, the fuel-efficient induction zone 710 and the present state indicator 720 are displayed on a one-dimensional coordinate axis having one axis corresponding to the output.

In the fuel-efficient induction zone 710 and the present state indicator 720 which are displayed on a one-dimensional coordinate axis, the fuel-efficient induction zone 710 itself is set in the same manner as in the first embodiment. In other words, in the second embodiment, the fuel-efficient induction zone 710 is also a zone in the form depicted in FIG. 13(a) (in other words, the fuel-efficient induction zone 710 depicted in FIGS. 3(a) and 3(b)). The fuel-efficient induction zone 710 and the present state indicator 720 displayed on a one-dimensional coordinate axis are explained hereinbelow.

In the second embodiment, as depicted in FIGS. 13(b) to 13(f), the fuel-efficient induction zone 710 corresponding to the present speed of the hybrid vehicle 10 (that is, the range of the output included in the fuel-efficient induction zone 710) is displayed in a display format of the so-called bar having a width on an output bar 740 associated with a range from the lower limit value of the output (0 kW in the second embodiment) to the upper limit value of the output. In particular, in the second embodiment, it is preferred that the display contents of the fuel-efficient induction zone 710 displayed on the one-dimensional coordinate axis be switched, as appropriate, according to the speed of the hybrid vehicle 10. Further, in the second embodiment, the present state indicator 720 is displayed on the position corresponding to the present output of the hybrid vehicle 10 (in other words, the position on the output bar 740).

Figure 13A:
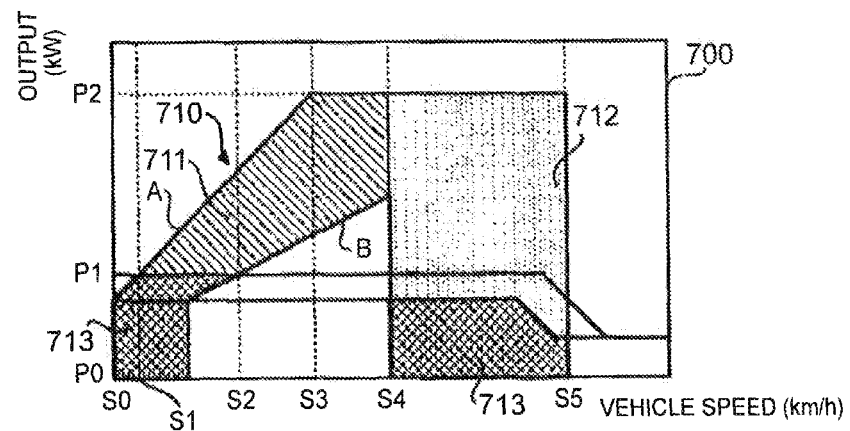
FIG. 13(a) to FIG. 13(f) are plan views depicting a display example in the case in which the fuel-efficient induction zone of the second embodiment is displayed together with the present state indicator of the second embodiment.
Figure 13B:
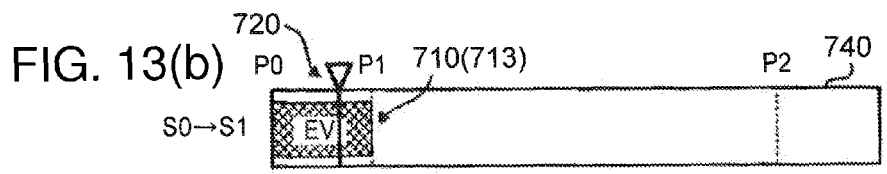

More specifically, a case is assumed in which, for example, the speed of the hybrid vehicle 10 is within a range from S0 corresponding to 0 km/h to S1 corresponding to the vehicle speed Where the upper edge of the acceleration recommended zone 711 and the ENG start threshold (OFF→ON) P1 intersect. In this case, it is preferred that the hybrid vehicle 10 run in the EV running mode (in other words, the speed and output of the hybrid vehicle 10 are included in the EV running zone 713). Therefore, on the output bar 740, the EV running zone 713 corresponding to the present speed of the hybrid vehicle 10 is displayed, as depicted in FIG. 13(b).

Figure 13C:
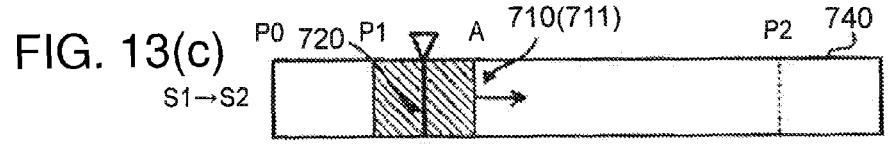

A case is then assumed in which, for example, the speed of the hybrid vehicle 10 is within a range from S1 to S2 corresponding to the vehicle speed where the lower edge B of the acceleration recommended zone 711 and the ENG start threshold (OFF→ON) P1 intersect. In this case, it is preferred that the hybrid vehicle 10 run such that the speed and output of the hybrid vehicle 10 are included in the acceleration recommended zone 711. Therefore, on the output bar 740, the acceleration recommended zone 711 corresponding to the present speed of the hybrid vehicle 10 is displayed, as depicted in FIG. 13(c). While the speed of the hybrid vehicle 10 is within a range from S1 to S2, as depicted in FIG. 13(a), the lower limit value of the output of the acceleration recommended zone 711 matches the ENG start threshold (OFF→ON) P1 at all times. Therefore, the lower limit value of the acceleration recommended zone 711 depicted in FIG. 13(c) remains fixed to P1 and does not move. Meanwhile, while the speed of the hybrid vehicle 10 is within a range from S1 to S2, as depicted in FIG. 13(a), the upper limit value of the acceleration recommended zone 711 increases in response to the increase in the vehicle speed. Therefore, the upper limit value of the acceleration recommended zone 711 depicted in FIG. 13(c) moves to the right in FIG. 13(c) according to the increase in the present speed of the hybrid vehicle 10.

Figure 13D:
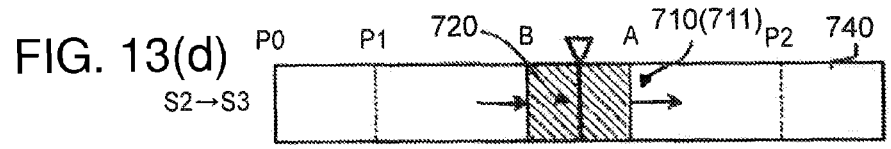

Then, a case is assumed in which, for example, the speed of the hybrid vehicle 10 is within a range from S2 to S3 corresponding to the vehicle speed at which the upper edge A of the acceleration recommended zone 711 and an upper limit P2 of the target output intersect. In this case, it is preferred that the hybrid vehicle 10 run such that the speed and output of the hybrid vehicle 10 are included in the acceleration recommended zone 711. Therefore, on the output bar 740, the acceleration recommended zone 711 corresponding to the present speed of the hybrid vehicle 10 is displayed, as depicted in FIG. 13(d). While the speed of the hybrid vehicle 10 is within a range from S2 to S3, as depicted in FIG. 13(a), the lower limit value and upper limit value of the output of the acceleration recommended zone 711 increases in response to the increase in the vehicle speed. Therefore, the lower limit value and upper limit value of the acceleration recommended zone 711 depicted in FIG. 13(d) moves to the right in FIG. 13(d) according to the increase in the present speed of the hybrid vehicle 10.

Figure 13E:
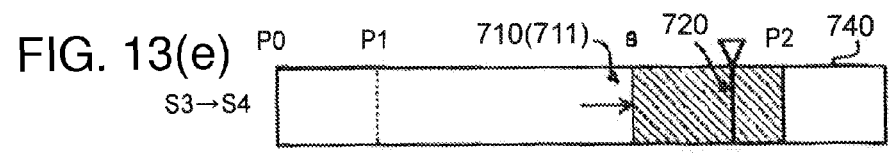
Figure 13F:
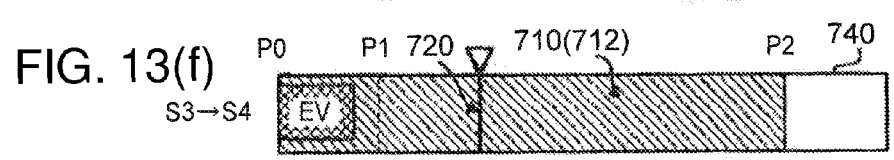

Then, a case is assumed in which, for example, the speed of the hybrid vehicle 10 is within a range from S3 to a lower limit S4 of the target vehicle speed. In this case, it is also preferred that the hybrid vehicle 10 run such that the speed and output of the hybrid vehicle 10 are included in the acceleration recommended zone 711. Therefore, on the output bar 740, the acceleration recommended zone 711 corresponding to the present speed of the hybrid vehicle 10 is displayed, as depicted in FIG. 13(e). While the speed of the hybrid vehicle 10 is within a range from S3 to S4, as depicted in FIG. 13(a), the lower limit value of the output of the acceleration recommended zone 711 increases in response to the increase in the vehicle speed. Therefore, the lower limit value of the acceleration recommended zone 711 depicted in FIG. 13(e) moves to the right in FIG. 13(e) according to the increase in the present speed of the hybrid vehicle 10. Meanwhile, while the speed of the hybrid vehicle 10 is within a range from S3 to S4, as depicted in FIG. 13(a), the upper limit value of the output of the acceleration recommended zone 711 matches the upper limit P2 of the target output at all times. Therefore, the upper limit value of the acceleration recommended zone 711 depicted in FIG. 13(*e*) remains fixed to P2 and does not move.

Then, a case is assumed in which, for example, the speed of the hybrid vehicle 10 is within a range from S4 to an upper limit S5 of the target vehicle speed. In this case, it is also preferred that the hybrid vehicle 10 run such that the speed and output of the hybrid vehicle 10 are included in the steady running shift zone 712. Therefore, on the output bar 740, the steady running shift zone 712 corresponding to the present speed of the hybrid vehicle 10 is displayed, as depicted in FIG. 13(*f*).

In addition, while the speed of the hybrid vehicle 10 is within a range from S4 to S5, it is preferred that the hybrid vehicle 10 start running in the EV running mode. Therefore, on the output bar 740, the EV running zone 713 corresponding to the present speed of the hybrid vehicle 10 is displayed, as depicted in FIG. 13(*f*).

Thus, in the second embodiment, the driver can operate the accelerator, or the like, while referring to the fuel-efficient induction zone 710, which encourages the improvement in the actual fuel consumption, and the present state marker 720 indicating the present operation state of the hybrid vehicle 10, in the same manner as in the first embodiment. More specifically, the driver can operate the accelerator, or the like, such that the present state marker 720 is included in the fuel-efficient induction zone 710. Therefore, various effects obtained in the first embodiment are also advantageously obtained in the second embodiment.

In the example described hereinabove, the hybrid vehicle 10 uses the hybrid system example, a Toyota hybrid system (THS)) of the so-called split (power split) type. However, it goes without saying that the above-described fuel-efficient induction zone 710 and the present state indicator 720 may be also displayed on the display 700 in the hybrid vehicle 10 using a series hybrid system or parallel hybrid system.

Further, in the example described hereinabove, for example, the above-described fuel-efficient induction zone 710 and the present state indicator 720 are displayed on the display 700 of the hybrid vehicle 10 equipped with motor generators MG1 and MG2 and also the engine 200. However, for example, the above-described fuel-efficient induction zone 710 and the present state indicator 720 may be displayed on the display 700 of a vehicle equipped with the engine 200 and not equipped with the motor generators MG1 and MG2 (a vehicle which runs by using only the drive power of the engine 200). However, in this case, it is preferred that the above-described EV running zone 713 be replaced with the optimal fuel consumption point or optimal fuel consumption zone (for example, a point or zone in which the instantaneous fuel consumption is good or optimal) of the engine 200.

Alternatively, for example, the above-described fuel-efficient induction zone 710 and the present state indicator 720 may be displayed on the display 700 of a vehicle equipped with at least one motor generator and not equipped with the engine 200 (the so-called electric automobile which runs by using only the drive power of the motor generator). However, in this case, it is preferred that the above-described EV running zone 713 be replaced with the optimal efficiency drive point or optimal efficiency drive zone (for example, a point, or zone in which the electric power consumption efficiency is good or optimal) of the motor generator.

The invention can be changed, as appropriate, without departing from the essence and spirit of the invention which can be understood from the entire description and the appended claims, and a display device incorporating such changes is also included in the technical scope of the invention

DESCRIPTION OF THE REFERENCE NUMERALS

10 hybrid vehicle
100 ECU
101 zone setting unit
102 state acquisition unit
103 display control unit
200 engine
300 transaxle
310 power split mechanism
400 inverter
500 battery
510 SOC sensor
700 display
710 fuel-efficient induction zone
711 acceleration recommended zone
712 steady running shift zone
713 EV running zone
720 present state indicator
721 speed line
722 output marker
723*a*, 723*b* excess-deficiency markers
730 history indicator
731 past marker
732 past trajectory line
MG1, MG2 motor generators

The invention claimed is:

1. A display device for a vehicle, the display device comprising: a display; and an electronic control unit (ECU) configured to a) a first operation amount so as to increase an output of the vehicle in a state in which a vehicle speed of the vehicle is less than a predetermined threshold, the first operation amount being an operation amount to be performed by an occupant of the vehicle; b) a second operation amount such that an operation state of the vehicle can be shifted to a desired operation state, in which optimal instantaneous fuel consumption is realized, by decreasing the output in a state in which the vehicle speed is equal to or greater than the predetermined threshold, the second operation amount being an operation amount to be performed by an occupant of the vehicle; and c) display, on the display, at least one of the first operation amount and the second operation amount, and a present operation amount which is an operation amount performed at present by the occupant.

2. The display control device according to claim 1, wherein the ECU is configured to display the first operation amount and the second operation amount continuously.

3. The display device according to claim 2, wherein the ECU is configured to display displays the first operation amount, the second operation amount, and a past operation amount together on the display, the past operation amount being an operation amount that has been performed by the occupant in the past.

4. The display device according to claim 1, wherein the ECU is configured to a) a first operation range being, as the first operation amount, an allowed range of an operation amount to be performed by the occupant so as to increase the output in a state in which the vehicle speed is less than the predetermined threshold; b) a second operation range being, as the second operation amount, to be performed by the occupant so as to shift the operation state of the vehicle to the desired operation state by decreasing the output in a state in which the vehicle speed is equal to or greater than the predetermined threshold; and c) display continuously the first operation range and the second operation range.

5. The display device according to claim 4, wherein the ECU is configured to display the first operation range, the second operation range and a past operation amount being an operation amount that has been performed by the occupant in the past.

6. The display device according to claim 1, wherein the ECU is configured to a) display the first operation amount and the present operation amount, but not display the second operation amount, when the vehicle speed is less than the predetermined threshold, and b) display the second operation amount and the present operation amount, but not display the first operation amount, when the vehicle speed is equal to or greater than the predetermined threshold.

7. The display device according to claim 1, wherein the ECU is configured to a) a first operation range, the first operation range being, as the first amount, an allowed range of an operation amount to be performed by the occupant so as to increase the output in a state in which the vehicle speed is less than the predetermined threshold; b) a second operation range, the second operation range being, as the second operation amount, an allowed range of an operation amount to be performed by the occupant so as to shift the operation state of the vehicle to the desired operation state by decreasing the output in the state in which the vehicle speed is equal to or greater than the predetermined threshold; c) display the first operation range and the present operation amount, but not display the second operation range, when the vehicle speed is less than the predetermined threshold; and d) display the second operation range and the present operation amount, but not display the first operation range, when the vehicle speed is equal to or greater than the predetermined threshold.

8. The display device according to claim 1, wherein the ECU is configured to set, as the first operation amount, an operation amount that can induce further acceleration of the vehicle, as compared with an operation amount when the output is increased while maintaining a state in which an instantaneous fuel consumption is optimal.

9. The display device according to claim 1, wherein the ECU is configured to set, as the first operation amount, an operation amount to be performed by the occupant so as to increase the output according to an increase in the vehicle speed.

10. The display device according to claim 1, wherein the ECU is configured to set, as the second operation amount, an operation amount to be performed by the occupant so as to decrease the output while maintaining the vehicle speed.

11. The display device according to claim 1, wherein the vehicle is a hybrid vehicle, the hybrid vehicle being equipped with an electrical storage device, a rotating electrical machine, and an internal combustion engine, the rotational electrical machine being configured to be driven by using power stored in the electrical storage device, and the internal combustion engine being configured to be driven by combustion of fuel; and the desired operation state is an operation state in which the hybrid vehicle can run in an EV running mode, the EV running mode being a mode in which running is performed by using drive power of the rotating electrical machine, without using drive power of the internal combustion engine.

\* \* \* \* \*

UNITED STATES PATENT AND TRADEMARK OFFICE
CERTIFICATE OF CORRECTION

PATENT NO. : 9,457,664 B2
APPLICATION NO. : 14/766555
DATED : October 4, 2016
INVENTOR(S) : T. Amano et al.

It is certified that error appears in the above-identified patent and that said Letters Patent is hereby corrected as shown below:

In the Specification

At Column 2, Line 59, change "improve actual" to -- improve the actual --.

At Column 3, Line 45, change "a period, of time" to -- a period of time --.

At Column 5, Line 63, change "the ease in" to -- the case in --.

At Column 8, Line 66, change "operation performed" to -- operations performed --.

At Column 14, Line 9, change "0.6 in/s$^2$ 1.0 m/s$^2$" to -- 0.6 m/s$^2$, 1.0 m/s$^2$ --.

At Column 14, Line 13, change "to nm steadily" to -- to run steadily --.

At Column 14, Line 30, change "in Which the" to -- in which the --.

At Column 14, Line 50, change "running other words," to -- running (in other words, --.

At Column 16, Line 52, change "the END start" to -- the ENG start --.

At Column 18, Line 52, change "run the EV" to -- run in the EV --.

At Column 18, Line 53, change "running node" to -- running mode --.

At Column 18, Line 59, change "period of which" to -- period of time in which --.

At Column 22, Line 33, change "is Less than" to -- is less than --.

At Column 24, Line 1, change "running shill mode" to -- running shift mode --.

Signed and Sealed this
Sixteenth Day of May, 2017

Michelle K. Lee
*Director of the United States Patent and Trademark Office*

CERTIFICATE OF CORRECTION (continued)
U.S. Pat. No. 9,457,664 B2

At Column 25, Line 62, change "speed Where the" to -- speed where the --.

In the Claims

At Column 28, Line 50, Claim 2, change "The display control device" to -- The display device --.